(12) United States Patent
Omori et al.

(10) Patent No.: US 8,597,778 B2
(45) Date of Patent: Dec. 3, 2013

(54) POROUS FORMED ARTICLE AND METHOD FOR PRODUCTION THEREOF

(75) Inventors: Akihiro Omori, Fuji (JP); Tadashi Shimizu, Fuji (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 1471 days.

(21) Appl. No.: 10/582,339

(22) PCT Filed: Dec. 14, 2004

(86) PCT No.: PCT/JP2004/018659
§ 371 (c)(1),
(2), (4) Date: Jun. 9, 2006

(87) PCT Pub. No.: WO2005/056175
PCT Pub. Date: Jun. 23, 2005

(65) Prior Publication Data
US 2007/0128424 A1      Jun. 7, 2007

(30) Foreign Application Priority Data

Dec. 15, 2003    (JP) ................................ 2003-416974

(51) Int. Cl.
*B32B 3/26* (2006.01)
(52) U.S. Cl.
USPC ........ 428/304.4; 210/266; 210/282; 210/284; 210/639; 264/41; 428/314.2
(58) Field of Classification Search
USPC ............... 210/639, 266, 282, 284; 428/304.4, 428/314.2, 315.5; 264/41
See application file for complete search history.

(56) References Cited

U.S. PATENT DOCUMENTS

| | | | | |
|---|---|---|---|---|
| 5,418,284 A | * | 5/1995 | Chang et al. | 525/54.1 |
| 6,689,465 B1 | * | 2/2004 | Omori et al. | 428/402 |

FOREIGN PATENT DOCUMENTS

| | | |
|---|---|---|
| IE | 57 683 B1 | 2/1993 |
| JP | 6-256560 | 9/1994 |
| JP | 9-187646 | 7/1997 |
| JP | 10277332 | 10/1998 |
| JP | 2001-276814 | 10/2001 |
| JP | 2002-18489 | 1/2002 |
| JP | 2002-38038 | 2/2002 |
| JP | 2003-305458 | 10/2003 |

OTHER PUBLICATIONS

Machine Translation of JP 09-187646, Mori et al.*
Machine Translation of JP 9-187646.*
Machine Translation of JP 2003-305458.*
Handbook of Water and Wastewater Treatment Technology, Paul N. Cheremisinoff, 1994, Chapter 4, p. 136.*
*Industry and Environment*, vol. 22, No. 2-3, Apr.-Sep. 1999, pp. 81-85.

(Continued)

*Primary Examiner* — Dirk Bass
(74) *Attorney, Agent, or Firm* — Finnegan, Henderson, Farabow, Garrett & Dunner, LLP

(57) ABSTRACT

A porous formed article which comprises an organic polymer resin and an inorganic ion absorbing material, and has communicating pores opening at an outer surface, wherein it has cavities in the interior of a fibril forming a communicating pore, at least a part of said cavities opens at the surface of the fibril, and the inorganic ion absorbing material is carried on the outer surface of said fibril and on the surface of inner cavities.

27 Claims, 6 Drawing Sheets

(56) References Cited

OTHER PUBLICATIONS

Boom, J.P. et al., "Zeolite Filled Membranes for Gas Separation and Pervaporation," Zeolites and Related Microporous Materials: State of the Art 1994; Studies in Surface Science and Catalysis, vol. 84, pp. 1167-1174 (1994).

Moon, Jei-Kwon et al., "Preparation of Organic-Inorganic Composite Adsorbent Beads for Removal of Radionuclides and Heavy Metal Ions," Journal of Radioanalytical and Nuclear Chemistry, vol. 246, No. 2, pp. 299-307 (2000).

Teoh, S.H. et al., "Tensile and Fracture Properties of Titanium-Polymer Interpenetrating Network Composites," Journal of Materials Science Letters, Chapman and Hall Ltd., London, GB, vol. 15, No. 17, pp. 1478-1480 (1996).

Supplementary European Search Report for Corresponding Application No. EP 04807018.9-1270/1695760 dated Mar. 16, 2011.

\* cited by examiner

POROUS FORMED ARTICLE AND METHOD FOR PRODUCTION THEREOF

TECHNICAL FIELD

The present invention relates to a porous formed article, method for production thereof, a field of application thereof, an apparatus using it and a method for operating the apparatus. The present invention particularly relates to the porous formed article suitable for an absorbing material for selectively absorbing and removing phosphor, boron, arsenic and fluorine ions contained in river water, treated sewage and industrial effluent.

BACKGROUND ART

In recent years, environmental quality standards for phosphor, boron, arsenic and fluorine ions in drinking water, industrial water, industrial wastewater, sewerage treated water and environmental water have been stiffened because of issues in environmental pollution and eutrophication, and a technology for removing them has been demanded.

Phosphor is one of agents causative of the eutrophication, and regulations on a closed area of water have been stiffened. It is also an element which is feared exhausted, and the technology to recover the element from effluent and reuse it has been demanded.

Boron is an element essential for the growth of plant but is known to adversely affect the growth of the plant when an excessive amount is given. Boron is further pointed out to have a possibility of giving an influence on the health of a human body, particularly causing health problems such as the deterioration of a generative function, when being contained in drinking water.

Arsenic is contained in effluent in a non-ferrous metal smelting industry, heated effluent from a geothermal power plant, and underground water in a particular area. It has been known since olden times that arsenic has toxicity. Arsenic tends to accumulate in a living body, and has been considered to cause chronic poisoning, weight reduction, sensory disturbance, liver disturbance, skin deposition and skin cancer.

Fluorine is often contained in effluent discharged from a metal-smelting, glass and electronic material industry. It has been concerned that fluorine may give the influence on a human body, and it has been known that it causes chronic fluorine toxicosis such as mottled tooth, osteosclerosis and thyroid gland disorder, when excessively ingested.

In addition, it is feared that amounts of these emitted hazardous materials will increase with the development of civilization, and the technology for effectively removing them has been demanded.

As for a conventional technology for removing these hazardous materials, a material has been known which has a hydrated ferrite of Ti, Zr or Sn deposited in a three-dimensional network structure made from polyurethane and polyacrylic acid base resin with the use of a suitable binding material (see Patent Document 1). This publicly known adsorbent is a material having the hydrated ferrite deposited on the three-dimensional network structure with the use of the binding material, and accordingly has a defect that the original ion exchange capacity of an adsorption substrate is not sufficiently developed and an adsorption rate decreases, because the used binding material plugs fine pores existing on the surface of the hydrated ferrite which is the adsorption substrate. The adsorbent also has a problem of supporting few amounts of the adsorption substrate in unit volume thereon, because of having a large cavity. The adsorbent further has to be produced with a complicated method.

In addition, the adsorbent is known which makes a hydrated cerium oxide powder supported on a high molecular material (see Non Patent Document 1). The adsorbent is porous, but has a thin film called a skin layer existing on its surface, and according has a defect of decreasing a diffusion rate of a substance to be adsorbed such as phosphor and boron into an absorbing material.

In addition, Patent Document 2 discloses an absorbing material produced by preparing a porous formed article made from cellulose, and making an adsorption substrate formed of hydrated zirconium oxide supported thereon afterward with an impregnation method. The absorbing material has a low binding force of the adsorption substrate because of making the adsorption substrate supported afterward with the impregnation method, and accordingly has a defect that the adsorption substrate flows out while being repeatedly used. In addition, cellulose tends to swell in water, and accordingly has a problem that when the absorbing material is packed in a column and a liquid is passed through it, a formed body is compressed and increases a pressure loss. Furthermore, cellulose has a property of being decomposed by a living organism, so that the absorbing material has a problem of being unsuitable for treating water in which miscellaneous microorganisms coexist such as sewage water, in point of durability in repeated use.

Patent Document 1: JP-A-09-187646
Patent Document 2: JP-A-2002-38038
Non-Patent Document 1: Industry and Environment, September, 1999, pp. 81-85

DISCLOSURE OF THE INVENTION

Problems to be Solved by the Invention

An object of the present invention is to provide a porous formed article which can absorb and remove low concentrations of phosphor, boron, fluorine and arsenic contained in service water and effluent at high speeds, has high durability, can be repeatedly used and is suitable for an adsorbent; a method for production thereof; further an apparatus using it; and a method for operating the apparatus.

Means for Solving the Problems

As a result of having made an extensive investigation for solving the above described problems, the present inventors have found that a formed body having no skin layer on its surface and a superior surface opening rate is obtained by adopting a method of dissolving an organic polymer resin in a suitable good solvent, further preparing a polymer solution that has dissolved a water-soluble polymer which is soluble in the good solvent and has an affinity for the organic polymer resin into the good solvent and mixed it with the organic polymer resin, suspending a powder of an inorganic ion absorbing material of an adsorption substrate in the polymer solution, and producing a formed body from the suspension by using a poor solvent as a solidification bath, and thus have accomplished the present invention on the basis of the finding. Specifically, the present invention is as the following.

(1) A porous formed article which comprises an organic polymer resin and an inorganic ion absorbing material and has communicating pores opening at an outer surface, wherein the porous formed article has cavities in the interior of a fibril forming a communicating pore, at least a part of the cavities opens at the surface of the fibril, and the inorganic ion absorbing material is supported on the outer surface of the fibril and on the surface of inner cavities.

(2) The porous formed article according to item (1), wherein the communicating pores have a maximum pore diameter in a layer in the vicinity of the surface of the formed body.

(3) The porous formed article according to any one of items (1) and (2), wherein the porous formed article has an average particle diameter of 100 to 2,500 μm and is substantially spherical.

(4) The porous formed article according to any one of items (1) to (3), wherein the organic polymer resin comprises one or more selected from the group consisting of ethylene-vinylalcohol copolymer (EVOH), polyacrylonitrile (PAN), polysulfone (PS) and polyvinylidene fluoride (PVDF).

(5) The porous formed article according to any one of items (1) to (4), wherein the inorganic ion absorbing material comprises a compound represented by the following formula (I) and/or the following formula (II):

$$MO_n \cdot mH_2O \quad (I)$$

$$M \cdot Fe_2O_4 \cdot mH_2O + xFe_3O_4 \cdot nH_2O \quad (II)$$

(wherein n is 1 to 4; m is 0.5 to 6; x is 0 to 3; and M is at least one metal selected from the group consisting of Ti, Zr, Sn, Sc, Y, La, Ce, Pr, Nd, Sm, Eu, Gd, Tb, Dy, Ho, Er, Tm, Yb, Lu, Al, Cr, Co, Ga, Fe, Mn, Ni, V, Ge, Nb and Ta: and in the formula (II), a symbol (+) denotes that the formula shows a mixture).

(6) The porous formed article according to any one of items (1) to (5), wherein the inorganic ion absorbing material comprises at least one selected from the group consisting of: a hydrated oxide of titanium, zirconium or tin; a hydrated ferrite of titanium, zirconium or tin; hydrated cerium oxide; hydrated lanthanum oxide; and activated alumina.

(7) A porous formed article according to any one of items (1) to (4), wherein the inorganic ion absorbing material comprises at least one selected from the group consisting of activated alumina impregnated with aluminum sulfate and activated carbon impregnated with aluminum sulfate.

(8) The porous formed article according to any one of items (1) to (7), wherein the inorganic ion absorbing material has a particle diameter of 0.01 to 100 μm.

(9) The porous formed article according to any one of items (1) to (8), wherein the inorganic ion absorbing material in an amount of 30 to 95% is supported thereon.

(10) The porous formed article according to any one of items (1) to (9), wherein the fibril comprises the organic polymer resin, the inorganic ion absorbing material and a water-soluble polymer.

(11) The porous formed article according to item (10), wherein the water-soluble polymer is a synthetic polymer.

(12) The porous formed article according to (10) or (11), wherein the water-soluble polymer is polyvinylpyrrolidone.

(13) The porous formed article according to any one of items (10) to (12), wherein the water-soluble polymer in an amount of 0.001 to 10% is contained therein.

(14) A column packed with the porous formed article according to any one of items (1) to (13).

(15) A method for producing a porous formed article comprising an organic polymer resin and an inorganic ion absorbing material, which comprises the steps of mixing the organic polymer resin, a good solvent for the organic polymer resin, the inorganic ion absorbing material and a water-soluble polymer; then forming the mixture into an article; and solidifying it in a poor solvent.

(16) The method according to item (15), wherein the good solvent for the organic polymer resin is one or more selected from the group consisting of dimethylsulfoxide (DMSO), N-methyl-2 pyrrolidone (NMP), dimethylacetamide (DMAC) and dimethylformamide (DMF).

(17) The method according to item (15) or (16), wherein the poor solvent is water, or a mixture of the good solvent for the organic polymer resin and water.

(18) The method according to any one of items (15) to (17), wherein a mixture ratio of the good solvent for the organic polymer resin to water in the mixture is 0 to 40%.

(19) The method according to any one of items (15) to (18), wherein the forming method comprises forming a droplet by scattering a slurry of the mixture of the organic polymer resin, the good solvent for the organic polymer resin, the inorganic ion absorbing material and the water-soluble polymer, from a nozzle provided on the side face of a rotating container.

(20) An ion-adsorbing device for adsorbing ions in a liquid by passing the liquid through a column, wherein the column is packed with a porous formed article according to any one of items (1) to (13).

(21) An ion-adsorbing device characterized in that a pH-controlling device is installed in a previous stage of the column according to item (20).

(22) An ion-adsorbing device characterized in that a solid-liquid separation device is installed in a previous stage of the ion-adsorbing device according to item (20) or (21).

(23) The ion-adsorbing device according to item (22), wherein the solid-liquid separation device is a membrane separation device.

(24) An ion-adsorbing device according to any one of items (20) to (23), further comprising water-sending means for supplying a desorption liquid to the column.

(25) The ion-adsorbing device according to any one of items (20) to (24), further comprising a crystallization tank, adding means for adding a crystallizing agent, a crystallizer provided with stirring means, and a solid-liquid separation device for separating precipitates produced in the crystallization tank into a solid and a liquid.

(26) The ion-adsorbing device according to item (25), wherein the solid-liquid separation device is a membrane separation device.

(27) The ion-adsorbing device according to item (25) or (26), further comprising liquid-supplying means for supplying an alkaline liquid which is obtained by separating a liquid from a solid after a crystallization reaction, to a column again.

(28) The ion-adsorbing device according to any one of items (20) to (27), further comprising liquid-supplying means for supplying a pH-adjusting liquid to the column.

(29) The ion-adsorbing device according to item (28), capable of adjusting pH of a porous formed article packed in the column, which further comprises a pH-adjusting tank, a pH controller, a chemical liquid injection pump working with the pH controller, pH-adjusting-liquid-supplying means, and a line for passing water in the pH-adjusting tank to the column, to repeatedly circulate the pH-adjusting liquid between the column and the pH-adjusting tank and adjust the pH.

(30) The ion-adsorbing device according to any one of items (20) to (29), further comprising liquid-supplying means for supplying wash water to the column.

(31) The ion-adsorbing device according to any one of items (20) to (30), further comprising pH-adjusting means for adjusting pH of treatment water flowing out from the column.

(32) A method for treating ions comprising contacting a liquid with the porous formed article according to any one of items (1) to (13).

(33) The method for treating ions according to item (32), wherein the ions are P, B, F and/or As.

(34) The method for treating ions according to item (32) or (33), comprising adjusting pH of a solution and then adsorbing the ions.

(35) The method for treating ions according to any one of items (32) to (34), further comprising solid-liquid-separating a solution and then adsorbing the ions.

(36) The method for treating ions according to item (35), wherein the means of solid-liquid separation is a membrane separation method.

(37) The method for treating ions according to any one of items (32) to (36), further comprising contacting the porous formed article according to any one of items (1) to (13) which has adsorbed ions in water by contacting with a solution, with a desorption liquid to desorb adsorbed ions from the formed article.

(38) The method for treating ions according to item (37), wherein the desorption liquid is alkaline.

(39) The method for treating ions according to item (38), wherein the desorption liquid is a sodium hydroxide solution.

(40) The method for treating ions according to any one of items (37) to (39), whether a desorption operation is conducted by adding a crystallizing agent to an alkaline aqueous solution having eluted the ions adsorbed in the formed article to precipitate the ions and subsequently separating the precipitate into a solid and a liquid.

(41) The method for treating ions according to item (40), wherein the method of solid-liquid separation is a membrane separation method.

(42) The method for treating ions according to item (40) or (41), wherein the crystallizing agent is a hydroxide of a polyvalent metal.

(43) The method for treating ions according to any one of items (40) to (42), wherein the hydroxide of the polyvalent metal is calcium hydroxide.

(44) The method for treating ions according to any one of items (40) to (43), wherein the alkaline solution obtained by being separated from a mixed liquid of a solid and a liquid in a crystallization tank is supplied to a column again, and is reused for desorption.

(45) The method for treating ions according to any one of items (32) to (44), further comprising adjusting pH of the porous formed article packed in the column by supplying pH-adjusting liquid to a column.

(46) The method for treating ions according to item (45), wherein the pH of the porous formed article is adjusted by repeatedly circulating the pH-adjusting liquid between the column and pH-adjusting tank.

(47) The method for treating ions according to item (45) or (46), wherein the pH-adjusting liquid is an acidic aqueous solution.

(48) The method for treating ions according to item (47), wherein the acidic aqueous solution is an aqueous solution of sulfuric acid.

(49) The method for treating ions according to any one of items (32) to (48), further comprising supplying wash water in a reverse direction to that in the adsorption step.

(50) The method for treating ions according to any one of items (32) to (49), further comprising adjusting the pH of treatment water flowing out from the column.

(51) A gas separation method comprising contacting a gas with the porous formed article according to any one of items (1) to (13).

(52) The separation method according to item (51), wherein the gas is gaseous ethylene, hydrogen sulfide, ammonia and/or methyl mercaptan.

(53) A porous absorbing product comprising the porous formed article according to any one of items (1) to (13).

Advantages of the Invention

A porous formed article according to the present invention has a high opening rate at an outer surface, so that a substance to be adsorbed diffuses inside the formed article at high speeds to increase a treatment speed.

In addition, the porous formed article has high durability, because it is produced by forming the solution having been prepared by kneading an adsorption substrate and a binder polymer, into the article, so that the adsorption substrate is strongly supported on the binder polymer, and does not flow out from the article even when repeatedly used.

Furthermore, a fibril itself of supporting the adsorption substrate thereon is porous, so that the adsorption substrate embedded in the fibril can also effectively function as an adsorbent and shows an extremely high efficiency of contacting with the substance to be adsorbed. Accordingly, the porous formed article acquires a high adsorbing capacity and can make an apparatus compact.

An organic polymer resin supporting an inorganic ion absorbing material according to the present invention hardly swells in water, and accordingly shows superior pressure resistance and durability when used for water treatment. In addition, the organic polymer resin is not decomposed by living organisms, and accordingly shows superior durability when repeatedly used for the water treatment of sewage water in which miscellaneous microorganisms coexist.

Furthermore, a water-soluble polymer coats boundaries between the adsorption substrate and the fibril which supports it, not to plug an active spot, so that the inorganic ion absorbing material has high adsorptive activity and shows superior adsorbing performance for ions. In addition, a polymer chain of the water-soluble polymer exists on the surface of the fibril, so that the surface shows hydrophilicity and superior antifouling properties.

Accordingly, the porous formed article can adequately treat such service water and effluent as to include low concentrations of phosphor, boron, fluorine and arsenic.

BEST MODE FOR CARRYING OUT THE INVENTION

Figure 1:
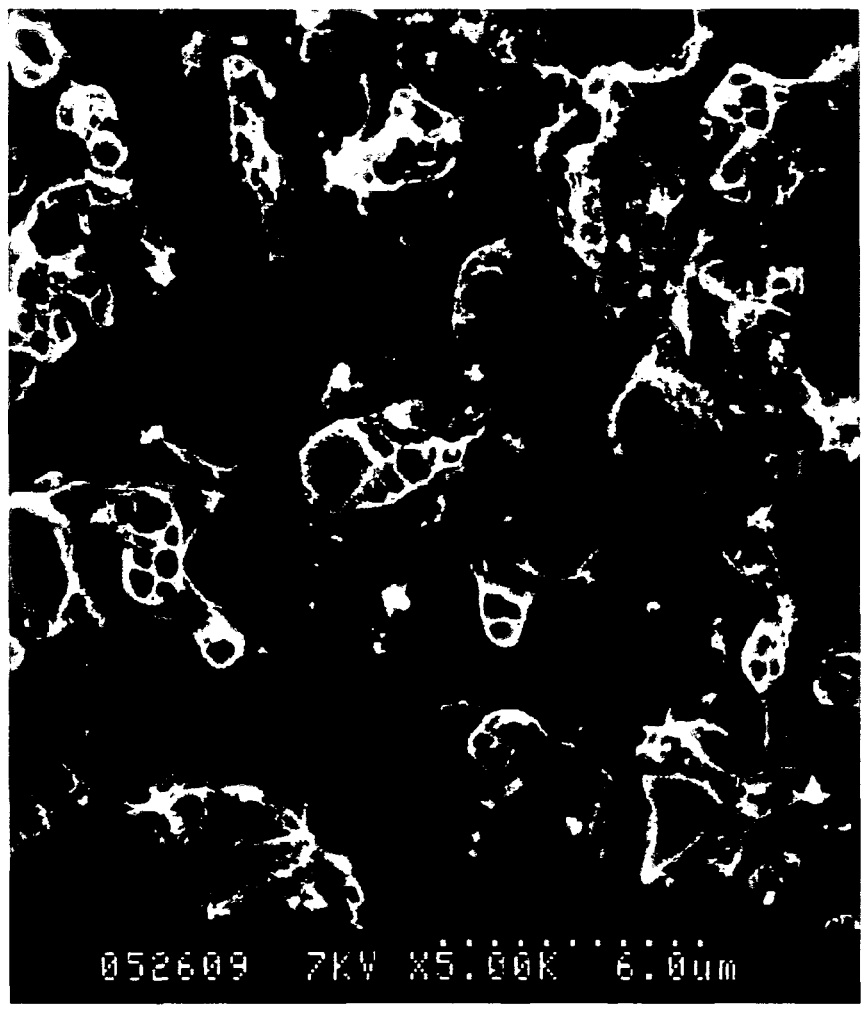
FIG. 1 is an electron microscope photograph (with magnification of 5,000 times) showing the torn surface of a formed article in Example 2.

The present invention will be specifically described below with a particular emphasis on a preferred embodiment thereof.

First of all, a structure of a formed article according to the present invention will be now described. The formed article according to the present invention has communicating pores and a porous structure; and furthermore, has no skin layer on the outer surface and a high opening rate at the surface. In addition, a fibril of forming the communicating pores has cavities in the inside, and at least some of the cavities are opened at the surface of the fibril.

The opening ratio at the outer surface of the formed article according to the present invention refers to the ratio of the total opening area of all pores with respect to an area of a visual field shown when the surface is observed with a scanning electron microscope. In the present invention, the opening ratio at the outer surface was measured by observing the surface of the formed article with a magnification of 10,000 times.

A range of the opening ratio at the surface is preferably 10 to 90%, and particularly preferably is 15 to 80%. When the opening ratio is less than 10%, a substance to be adsorbed such as phosphor and boron diffuses into the formed article at low speeds, and on the other hand, when the opening ratio is more than 90%, the formed article acquires insufficient strength, and it is difficult to achieve a formed article with excellent mechanical strength.

A diameter of the opening at the outer surface of the formed article according to the present invention is determined by observing the surface with the scanning electron microscope. When the pore has a circular shape, the diameter of the opening is used as the pore diameter, and when the pore has other shape than the circular shape, the circle-equivalent diameter of a circle having the same area is used as the pore diameter.

The range of the diameter of the opening at the surface is preferably 0.005 to 100 μm, and particularly preferably is 0.01 to 50 μm. When the diameter of the opening is smaller than 0.005 μm, a substance to be adsorbed such as phosphor and boron diffuses into the formed article at low speeds, and on the other hand, when the diameter of the opening is larger than 100 μm, the formed article tends to acquire insufficient strength.

A formed article according to the present invention has also cavities in a fibril which forms communicating pores, and at least some of the cavities are opened at the surface of the fibril. An inorganic ion absorbing material is supported on the outer surface of the fibril and the surface of the cavities inside the fibril. Because the fibril in itself is also porous, the inorganic ion absorbing material which is an adsorption substrate embedded therein can also contact with a substance to be adsorbed such as phosphor and boron and can effectively function as an adsorbent.

The porous formed article according to the present invention provides porosity also at a portion supporting the adsorption substrate as described above, accordingly seldom shows a phenomenon that a binder plugs a fine adsorption site of the adsorption substrate, which has been a defect of a conventional method of producing a porous formed article after having kneaded the adsorption substrate and the binder, and can effectively make use of the adsorption substrate.

Here, a fibril refers to a fibrous structure which is made from an organic polymer resin and forms a three-dimensionally continuous network structure on the outer surface and the inside of the formed article.

Figure 2:
FIG. 2 is an electron microscope photograph (with magnification of 10,000 times) showing the torn surface of a formed article in Example 2.

The cavities in the fibril and the apertures of the fibril surface are determined by observing the torn surface of the formed article with a scanning electron microscope. FIG. 1 is a photograph of the torn surface of the formed article observed with a transmission electron microscope at a magnification of 5,000 times, and FIG. 2 is a photograph of the torn surface of the same formed article observed with a transmission electron microscope at a magnification of 10,000 times. It is observed that there are cavities in the cross section of the fibril and the surface of the fibril is opened. Furthermore, it is observed that the powder of an inorganic ion absorbing material is supported on the cavity surface, on the outer surface and in the inside of the fibril.

A thickness of the fibril is preferably 0.01 to 50 μm.

A diameter of the aperture on the fibril surface is preferably 0.001 to 5 μm.

A mechanism of developing a structure of a formed article according to the present invention will be now considered.

In general, a method of immersing a mixture of a polymer and an good solvent of the polymer in a poor solvent to gelate the polymer through exchanging the solvent and form a porous body is called a wet phase-separation method. In these processes, as a ratio of the good solvent to the poor solvent decreases, micro-phases separate, globules of a polymer are formed, grow and are entangled to form a fibril, and a gap between the fibrils becomes a communicating pore.

Furthermore, the formed article structure is determined (progress of solidification) sequentially from the outer surface to the inside, as the poor solvent diffuses inward. In the method, it is general that a dense layer called a skin layer is formed on the surface of the formed article.

In contrast to this, in the present invention, a water-soluble polymer described below is added, which disperses and interposes between the entangled polymers during the process of phase separation, communicates pores with each other, makes the inside of the fibril porous as well, and further makes the fibril surface opened as well. Furthermore, the outer surface of the formed article is opened, and it is thought that the formed article without the skin layer is obtained.

In addition, one part of a water-soluble polymer is eluted into a poor solvent side in the process of the phase separation, but another part remains in the fibril in the state of being entangled with a molecular chain of the organic polymer resin. It is thought that the remaining water-soluble polymer coats the gap between the adsorption substrate of the inorganic ion absorbing material and the fibril, and plays a role of preventing an active spot of the adsorption substrate from being plugged. Accordingly, the porous formed article according to the present invention can use almost the entire adsorption capacity original to the supported inorganic ion absorbing material, and accordingly shows high efficiency.

Furthermore, the water-soluble polymer extends one part of the molecular chain of it from the surface of the fibril just like whisker, thereby keeps the surface of the fibril hydrophilic, and is expected to show an effect of preventing fouling due to the adsorption of a hydrophobic substance.

A porous formed article according to the present invention has a layer having the maximum pore diameter of a communicating pore, preferably in the vicinity of the surface of the formed article. Here, the layer having the maximum pore diameter refers to a part having the largest pore diameter in a pore distribution of the communicating pores reaching to the inside from the surface of the formed article. When the formed article has a large cavity with a circular form or an ellipse form (finger form) referred to as a void, the layer having the maximum pore diameter refers to a layer in which the void exists.

The vicinity of the surface means the part inward from the outer surface to the center of the formed article, by 25% of a torn surface diameter.

Because the layer having the maximum pore diameter exists in the vicinity of the formed article surface, the formed article has an effect of promptly diffusing a substance to be adsorbed into the inside. Accordingly, the formed article can quickly take the substance to be adsorbed such as phosphor and boron inside, and remove it from treatment water.

The maximum pore diameter and a position of the layer having the maximum pore diameter are determined by observing the surface and the torn surface of the formed article with a scanning electron microscope.

When the pore has a circular shape, the diameter of the opening is used as the pore diameter, and when the pore has a shape other than the circular shape, the circle-equivalent diameter of a circle having the same area is used as the pore diameter.

The form of the formed article can be an arbitrary form such as a particulate shape, a thready form, a sheet form, a hollow fiber form, a columnar form and a hollow cylindrical form.

A method for forming a particle-shaped formed article is not limited in particular, but includes a method of spraying a polymer solution from a one-fluid nozzle or a two-fluid nozzle, and solidifying the solute in a solidification bath.

Particularly, a rotary nozzle method described below is preferable because it provides the particle-shaped formed article with a uniform particle size distribution. The rotary nozzle method is the method for forming droplets by scattering the polymer solution (mixed slurry of an organic polymer resin, an good solvent for the organic polymer resin, an inorganic ion absorbing material and a water-soluble polymer) by centrifugal force, from the nozzle installed on the side face of a rotating container which rotates at a high speed.

The diameter of the nozzle is preferably in a range of 0.1 to 10 mm, and more preferably is in a range of 0.1 to 5 mm. When the diameter of the nozzle is smaller than 0.1 mm, the droplets tend to hardly scatter, and when the diameter of the nozzle is larger than 10 mm, the particle size distribution tends to spread.

Centrifugal force is expressed by centrifugal acceleration, is preferably in a range of 5 to 1,500 G, is more preferably in a range of 10 to 1,000 G, and is further preferably in a range of 10 to 800 G. When the centrifugal acceleration is less than 5 G, the droplets tend to be hardly formed and be scattered, and when the centrifugal acceleration is more than 1,000 G, the particle size distribution tends to spread because a polymer liquid is spouted in a thread form.

A thread-shaped formed article and a sheet-shaped formed article can be produced by a method of extruding a polymer solution from a spinneret or a die with a corresponding shape, and solidifying the polymer solution in a poor solvent. The hollow-fiber-shaped formed article can be similarly formed by using the spinneret made of a ring-shaped orifice. The columnar formed article and a hollow-cylindrical formed article may be formed by cutting a raw polymer solution which has been extruded into a thready shape from the spinneret, and solidifying it in a poor solvent, or may be formed by solidifying the raw polymer solution into the thready shape and then cutting it.

Above all, when the formed article is used as an adsorbent in the field of water treatment, it has preferably a particulate shape from the viewpoint of a pressure loss occurring when the formed article is packed in a column and water is passed therethrough, an effectivity of a contact area and handleability, and particularly preferably is a spherical particle (which may be not only a spherical form but also an ellipse spherical form).

An average particle diameter of a spherical formed article according to the present invention is a mode diameter (modal particle diameter) of a sphere-equivalent diameter determined from an angle distribution of scattered light intensity in diffraction with the use of a laser beam, while considering the particle as a spherical shape. The average particle diameter is preferably in a range of 100 to 2,500 µm, and particularly preferably is in a range of 200 to 2,000 µm. When the average particle diameter is smaller than 100 µm, a pressure loss tends to increase when the formed article is packed in a column or a tank, and when the average particle diameter is larger than 2,500 µm, the surface area becomes small when the formed article is packed in a column or a tank, which tends to decrease treatment efficiency.

A porosity Pr (%) of the formed article according to the present invention refers to a value expressed by the following expression, when $W1$ (g) is defined as a weight of the formed article in a state of containing water, $W0$ (g) as a weight after having been dried, and $\rho$ as a specific gravity of the formed article.

$$Pr = (W1-W0)/(W1-W0+W0/\rho) \times 100$$

It is recommended to measure the weight in the state of containing water, by spreading a sufficiently-water-wet formed article on dry filter paper to remove excess water and weighing thus treated formed-article. As a drying method, a vacuum drying is recommended which dries the formed article in a vacuum atmosphere under room temperature so as to remove moisture. The specific gravity of the formed article can be easily measured with the use of a pycnometer.

The porosity Pr (%) is preferably in a range of 50 to 90%, and particularly preferably is in a range of 60 to 85%. When the porosity is less than 50%, the contact frequency of a substance to be adsorbed such as phosphor and boron with an inorganic ion absorbing material of an adsorption substrate tends to be insufficient. When the porosity is more than 90%, the formed article tends to acquire insufficient strength.

An amount of a supported inorganic ion absorbing material in a formed article according to the present invention refers to a value expressed by the following expression, when $Wd(g)$ is defined as a weight of the formed article in a state of having been dried, and Wa(g) is defined as the weight of an ash content in the formed article.

Amount (%) of supported inorganic ion absorbing material=$Wa/Wd \times 100$

Here, the ash content refers to a retained material after the formed article according to the present invention has been fired at 800° C. for two hours.

The amount of the supported inorganic ion absorbing material is preferably in a range of 30 to 95%, further preferably is in a range of 40 to 90%, and particularly preferably is in a range of 65 to 90%. When the amount of the supported inorganic ion absorbing material is less than 30%, the contact frequency of a substance to be adsorbed such as phosphor and boron with an inorganic ion absorbing material of an adsorption substrate tends to be insufficient, and when it is more than 95%, the formed article tends to acquire insufficient strength.

A method according to the present invention produces a formed article after having kneaded an adsorption substrate and an organic polymer resin, in contrast to an impregnation method of a conventional technology, and accordingly can provide a formed article which supports a large amount of the adsorption substrate thereon and has high strength.

A specific surface area of a formed article according to the present invention is defined in the following expression.

Specific surface area (m$^2$/cm$^3$)=$S_{BET} \times$ bulk specific gravity (g/cm$_3$)

Here, $S_{BET}$ is the specific surface area (m$^2$/g) per unit weight of the formed article.

The specific surface area is measured with the BET method after having vacuum-dried the formed article at room temperature.

The bulk specific gravity of the formed article having a short shape such as a particulate shape, a columnar shape and a hollow cylindrical shape is determined by measuring an apparent volume of the formed article in a wet condition, with the use of a measuring cylinder or the like; and subsequently vacuum-drying it at room temperature to measure the weight.

The bulk specific gravity of the formed article having a long shape such as a thready shape, a hollow fiber shape and a sheet shape is determined by measuring a cross section and a length in a wet state; calculating the volume from the product of both values; and subsequently vacuum-drying it at room temperature to measure the weight.

The specific surface area is preferably in a range of 5 to 500 m$^2$/cm$^3$. When the specific surface area is less than 5 m$^2$/cm$^3$, the amount of the supported adsorption substrate and an adsorbing performance tend to be insufficient. When the specific surface area is more than 500 m$^2$/cm$^3$, the strength of the formed article tends to be insufficient.

In general, the adsorbing performance (adsorbing capacity) of an inorganic ion absorbing material of an adsorption substrate is proportionate to the specific surface area, in many cases. When the surface area per unit volume is small, the adsorbing capacity and the adsorbing performance of an inorganic ion absorbing material are low when the formed body is packed in a column or a tank, so that the column or the tank hardly achieves high-speed treatment.

A formed article according to the present invention is porous and has a three-dimensional network structure in which fibrils are complicatedly entangled. Furthermore, the formed article has a feature of possessing a large surface area, because the fibril in itself has cavities. The formed article further supports an adsorption substrate (inorganic ion absorbing material) having a larger specific surface area thereon, and accordingly has a feature that the surface area per unit volume is large.

In the next place, a method for producing a porous formed article according to the present invention will be described.

A method for producing a porous formed article according to the present invention is characterized in that the method comprises: mixing an organic polymer resin, an good solvent therefor, an inorganic ion absorbing material and a water-soluble polymer; forming the mixture into the form; and solidifying it in a poor solvent.

An organic polymer resin used in the present invention is not limited in particular, but is preferably a resin which can be made porous by a wet phase-separation process. The resin includes many kinds of polymers such as polysulfone-based polymer, polyvinylidene-fluoride-based polymer, polyvinylidene-chloride-based polymer, acrylonitrile-based polymer, poly(methyl methacrylate)-based polymer, polyamide-based polymer, polyimide-based polymer, cellulosic polymer and ethylene-vinylalcohol-copolymer-based polymer.

A particularly preferred resin is ethylene-vinylalcohol copolymer (EVOH), polyacrylonitrile (PAN), polysulfone (PS) and polyvinylidene fluoride (PVDF), from the viewpoint of an unswelling property and biodegradation resistance in water, and productionability; and ethylene-vinylalcohol copolymer (EVOH) is further preferable, in point of having both of hydrophilicity and chemical resistance.

In addition, an good solvent used in the present invention can be any solvent, as long as it can dissolve both of an organic polymer resin and a water-soluble polymer therein. The solvent includes, for instance, dimethylsulfoxide (DMSO), N-methyl-2 pyrrolidone (NMP), dimethylacetamide (DMAC) and dimethylformamide (DMF). These good solvents may be used either in a single form or a mixed form.

A content of the good solvent in the organic polymer resin is not limited in particular, but is preferably 5 to 40 wt. %, and further preferably is 7 to 30 wt. %. When the content is less than 5 wt. %, it is difficult to obtain a formed body with strength. When the content is more than 40 wt. %, it is difficult to obtain the porous formed article with high porosity.

A water-soluble polymer used in the present invention is not limited in particular, as long as it has compatibility with an organic polymer resin.

The water-soluble polymer includes a natural polymer such as guar gum, locust bean gum, carrageenan, gum arabic, tragacanth, pectin, starch, dextrin, gelatine, casein and collagen; a semisynthetic polymer such as methyl cellulose, ethyl cellulose, hydroxyethyl cellulose, ethyl hydroxyethyl cellulose, carboxymethyl starch and methyl starch; further a synthetic high polymer such as polyvinyl alcohol, polyvinylpyrrolidone, polyvinylmethyl ether, carboxyvinyl polymer, sodium polyacrylate; and further a polyethylene glycol such as tetraethylene glycol and triethylene glycol.

Among these water-soluble polymers, the synthetic high polymer is preferable because of having biodegradation resistance.

It is particularly preferable to use polyvinylpyrrolidone as the water-soluble polymer, because it has an excellent effect of developing a structure having cavities inside a fibril forming communicating pores, like a formed article according to the present invention in particular.

A weight average molecular weight of polyvinylpyrrolidone is preferably in a range of 2,000 to 2,000,000, more preferably is in a range of 2,000 to 1,000,000, and further preferably is in a range of 2,000 to 100,000. When the weight average molecular weight is less than 2,000, the polyvinylpyrrolidone tends to decrease an effect of developing a structure having cavities in a fibril, and when the weight average molecular weight is more than 2,000,000, the polyvinylpyrrolidone tends to increase the viscosity of the solution used for forming, and hardly make the solution formed into an article.

A content of a water-soluble polymer in a formed article according to the present invention refers to a value represented by the following expression, when Wd (g) is defined as a weight of the formed article in a state of having been dried, and Ws (g) is defined as the weight of the water-soluble polymer extracted from the formed article.

Content (%)=$Ws/Wd \times 100$

The content of the water-soluble polymer is preferably 0.001 to 10%, and further preferably is 0.01 to 1%, though depending on a type and the molecular weight of the water-soluble polymer. When the content is less than 0.001%, the water-soluble polymer does not always sufficiently show the effect of opening the surface of the formed article, and when the content is more than 10%, polymer concentration is relatively decreased, which occasionally makes the strength insufficient.

Here, the weight Ws of the water-soluble polymer in the formed article is measured as described below. At first, determine the weight of the extracted water-soluble polymer by the steps of: pulverizing a dried formed article in a mortar or the like; extracting the water-soluble polymer from the pulverized substance with the use of an good solvent for the water-soluble polymer; and subsequently evaporating the extract to dry it. Furthermore, identify the extracted evaporated-and-dried substance, and confirm whether the water-soluble polymer remains unextracted in the fibril by using an infrared absorption spectrum (IR) and the like. When the water-soluble polymer remains unextracted in the fibril, quantify the content of the water-soluble polymer by the steps of: dissolving the porous formed article according to the present invention with the good solvent for both of an organic polymer resin and the water-soluble polymer; removing an inorganic ion absorbing material with a filter to prepare a filtrate; and subsequently analyze the filtrate with the use of GPC or the like.

The content of the water-soluble polymer can be appropriately adjusted by changing a combination of the molecular weight of the water-soluble polymer, an organic polymer resin and an good solvent therefor. For instance, the use of the water-soluble polymer with the high molecular weight can increase the content, because the water-soluble polymer is strongly entangled with the organic polymer resin through their molecule chains, and hardly migrates to a poor solvent side when the solution will be formed into the article.

An inorganic ion absorbing material used in the present invention refers to an inorganic substance showing an ion-adsorbing phenomenon.

For instance, the inorganic ion absorbing material includes a natural product such as zeolite, montmorillonite and various mineral substances; and a synthetic material such as a metallic oxide and an insoluble hydrated oxide. In the former, a representative substance includes kaolin mineral which is aluminosilicate and has a monolayer lattice, muscovite with a two-layer lattice structure, glauconite, Kanuma soil, pyrophyllite, talc, feldspar with a three-dimensional framing structure and zeolite. In the latter, a principal compound includes a composite metalhydroxide, a metallic oxide, a hydrated oxide of metal, an acid salt of a polyvalent metal, an insoluble heteropolyacid salt and an insoluble hexacyanoferrate.

The composite metal hydroxide includes a hydrotalcite-based compound shown in the following formula (III):

$$M^{2+}_{(1-x)}M^{3+}_{x}(OH^{-})_{(2+x-y)}(A^{n-})_{y/n} \quad \text{(III)}$$

(wherein $M^{2+}$ represents at least one bivalent metal ion selected from the group consisting of $Mg^{2+}$, $Ni^{2+}$, $Zn^{2+}$, $Fe^{2+}$, $Ca^{2+}$ and $Cu^{2+}$; $M^{3+}$ represents at least one trivalent metal ion selected from the group consisting of $Al^{3+}$ and $Fe^{3+}$; $A^{n-}$ represents an n-value anion; x represents a value satisfying $0.1 \leq x \leq 0.5$; y represents a value satisfying $0.1 \leq y \leq 0.5$; and n is 1 or 2).

The metallic oxide includes activated alumina, an iron oxide such as FeO, $Fe_2O_3$ and $Fe_3O_4$, and silica gel.

The hydrated oxide of metal can be expressed by formula (I) or formula (II); and may be a mixture with any combined form of the formula (I) and the formula (II);

$$MO_n \cdot mH_2O \quad \text{(I)}$$

$$M \cdot Fe_2O_4 \cdot mH_2O + xFe_3O_4 \cdot nH_2O \quad \text{(II)},$$

wherein n is a number of 1 to 4; m is a number of 0.5 to 6; and x is a number of 0 to 3.

The formula (I) shows the general formula of a hydrated oxide, and the formula (II) shows the mixture of a hydrated ferrite and the hydrated oxide of iron. In the formula, M is at least one metal selected from the group consisting of Ti, Zr, Sn, Sc, Y, La, Ce, Pr, Nd, Sm, Eu, Gd, Tb, Dy, Ho, Er, Tm, Yb, Lu, Al, Cr, Co, Ga, Fe, Mn, Ni, V, Ge, Nb and Ta. In addition, in the formula (II), +means a mixture. A preferred M is Ti, Zr, Sn and Ce in particular in point of adsorption capacity and dissolution resistance to acid and alkali.

Furthermore, when considering cost efficiency, a preferred inorganic ion absorbing material is the mixture of the hydrated ferrite and the hydrated oxide of iron expressed by the formula (II). Further preferably, the metal M of the hydrated ferrite in the formula (II) is Zr.

Specific examples of the hydrated oxide represented by the formula (I) are as follow:
the hydrated oxide of titanium expressed by the following general formula:

$$TiO_2 \cdot nH_2O$$

(wherein n is a number of 0.5 to 2.0);
the hydrated oxide of zirconium expressed by the following general formula:

$$ZrO_2 \cdot nH_2O$$

(wherein n is a number of 0.5 to 2.0);
the hydrate of tin expressed by the following general formula:

$$SnO_2 \cdot nH_2O$$

(wherein n is a number of 0.5 to 2.0);
the hydrated oxide of cerium expressed by the following general formula:

$$CeO_2 \cdot nH_2O$$

(wherein n is a number of 0.5 to 2.0).

Specific examples of a mixture of a hydrated ferrite and a hydrated oxide of iron expressed by formula (II) are as follow:
the mixture of the hydrated ferrite of titanium and the hydrated oxide of iron expressed by the following general formula:

$$Ti \cdot Fe_2O_4 \cdot mH_2O + xFe_3O_4 \cdot nH_2O$$

(wherein n is a number of 1 to 4; m is a number of 0.5 to 6; and x is a number of 0 to 3);
the mixture of the hydrated ferrite of zirconium and the hydrated oxide of iron expressed by the following general formula:

$$Zr \cdot Fe_2O_4 \cdot mH_2O + xFe_3O_4 \cdot nH_2O$$

(wherein n is a number of 1 to 4; m is a number of 0.5 to 6; and x is a number of 0 to 3);

the mixture of the hydrated ferrite of tin and the hydrated oxide of iron expressed by the following general formula:

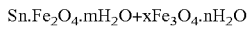
$$Sn.Fe_2O_4.mH_2O+xFe_3O_4.nH_2O$$

(wherein n is a number of 1 to 4; m is a number of 0.5 to 6; and x is a number of 0 to 3);

the mixture of the hydrated ferrite of cerium and the hydrated oxide of iron expressed by the following general formula:

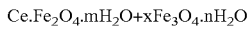
$$Ce.Fe_2O_4.mH_2O+xFe_3O_4.nH_2O$$

(wherein n is a number of 1 to 4; m is a number of 0.5 to 6; and x is a number of 0 to 3).

A method for producing a hydrated oxide represented by formula (I) is not limited in particular, but it is produced, for instance, by the method described below. A precipitate obtained by adding an alkaline solution into an aqueous solution of a salt such as a chloride, a sulfate and a nitrate of metal is filtrated, cleaned, and then dried. As for the drying method, air-drying, or drying at about 150° C. or lower, preferably about 90° C. or lower for about 1 to 20 hours is employed.

The hydrated oxide represented by formula (II) is a mixture of a hydrated ferrite and a hydrated oxide of iron. A method for producing the compound is not limited in particular, but it is produced, for instance, by the method described below. To a solution which has dissolved the metal salt and contains thus prepared metal ions, a ferrous salt equivalent to about 0.2 to 11 times moles with respect to the metal ions contained in the solution is added, then alkali is added to the solution, and the pH of the solution is kept to about 6 or more, and preferably about 7 to 12. Then, the solution is controlled to the temperature of about 30 to 100° C., as needed, and then an oxidizing gas such as air, oxygen gas and ozone is blown into the solution, or an oxidizing agent such as hydrogen peroxide water is added to the solution, to produce the precipitate of a hydrated ferrite. The produced precipitate is filtrated, washed with water and then dried. As for the drying method, air-drying, or drying at about 150° C. or lower, preferably about 90° C. or lower for about 1 to 20 hours is employed. A water content of the precipitate after having been dried is preferably in a range of about 6 to 30 wt. %. Here, the hydrated oxide of iron refers to a hydrate (monohydrate, dihydrate, trihydrate and tetrahydrate) of an oxide of iron such as FeO, $Fe_2O_3$ and $Fe_3O_4$. A ratio of the hydrated ferrite to the hydrated oxide of iron shall be such a value that the hydrated ferrite content is 24 to 100 wt. %, and preferably is 50 to 99 wt. %.

A metal salt of titanium, zirconium, tin or cerium used in the above described production method includes, for instance, titanium tetrachloride ($TiCl_4$), titanium sulfate ($Ti(SO_4)_2$), titanyl sulfate ($TiO(SO_4)$), zirconium oxychloride ($ZrOCl_2$), zirconium tetrachloride ($ZrCl_4$), zirconium nitrate ($Zr(NO_3)_4$), zirconium sulphate ($Zr(SO_4)_2$), zirconium acetate ($Zr(CH_3COO)_4$), tin tetrachloride ($SnCl_4$), tin nitrate ($Sn(NO_3)_4$), tin sulfate ($Sn(SO_4)_2$), cerium tetrachloride ($CeCl_4$), cerium nitrate ($Ce(NO_3)_4$) and cerium sulfate ($Ce(SO_4)_2$)). These metal salts may be hydrate salts such as $Zr(SO_4)_2 \cdot 4H_2O$. The metal salts are normally used in a form of a solution of about 0.05 to 2.0 moles per liter. A ferrous salt includes, for instance, ferrous sulfate ($FeSO_4$), ferrous nitrate ($Fe(NO_3)_2$) and ferrous chloride ($FeCl_2$). These ferrous salts may be also hydrate salts such as $FeSO_4 \cdot 7H_2O$.

The ferrous salts are normally added in a form of a solid but may be added in a solution state. The alkali includes, for instance, sodium hydroxide, potassium hydroxide, calcium hydroxide, ammonia and sodium carbonate. These alkalis are used in an aqueous solution containing preferably about 5 to 20 wt. % of each. When an oxidizing gas is blown, the period of blowing time is normally about 1 to 10 hours, though depending on a type of the oxidizing gas. An oxidizing agent to be used includes, for instance, hydrogen peroxide, sodium hypochlorite and potassium hypochlorite.

An inorganic ion absorbing material to be supported on a porous formed article according to the present invention preferably is at least one compound selected from the group consisting of: a hydrated oxide of titanium, zirconium and tin; a hydrated ferrite of titanium, zirconium and tin; hydrated cerium oxide; hydrated lanthanum oxide; activated alumina; activated alumina impregnated with aluminum sulfate; and activated carbon impregnated with aluminum sulfate; because they have an excellent adsorbing performance for P, B, F and As.

An inorganic ion absorbing material according to the present invention is preferably a fine particle as much as possible, and has a particle diameter in a range of 0.01 to 100 µm, preferably in a range of 0.01 to 50 µm, and further preferably in a range of 0.01 to 30 µm.

When the particle diameter is smaller than 0.01 µm, slurry used in the production tends to increase its viscosity and be hardly formed into an article, and when the particle diameter is larger than 100 µm, the inorganic ion absorbing material reduces its specific surface area, and tends to decrease its adsorbing performance.

The particle diameter described above refers to the particle diameter of both or a mixture of a primary particle and a secondary particle which is an aggregate of the primary particles.

The particle diameter of an inorganic ion absorbing material according to the present invention is a mode diameter (modal particle diameter) of a sphere-equivalent diameter determined from an angle distribution of scattered light intensity in diffraction with the use of a laser beam.

A poor solvent to be used in a method according to the present invention includes, for instance, water; an alcohol such as methanol and ethanol; an ether; and an aliphatic hydrocarbon such as n-hexane and n-heptane; each of which is such a liquid as not to dissolve an organic polymer resin therein. However, it is preferable to use water. In addition, it is possible to control a rate of solidifying the organic polymer resin by adding a small amount of an good solvent for the organic polymer resin into the poor solvent. A mixture ratio of the good solvent for the polymer resin to water is preferably 0 to 40%, and further preferably is 0 to 30%. When the mixture ratio is higher than 40%, the rate of the solidification is decreased, so that the shape of a formed article tends to be distorted, because when a polymer solution formed into a droplet or the like enters into the poor solvent and while it moves therein, the formed article receives frictional force occurring between itself and the poor solvent.

A temperature of the poor solvent is not limited in particular, but is preferably −30° C. to 90° C., more preferably 0° C. to 90° C., and further preferably 0° C. to 80° C. When the temperature of the poor solvent is higher than 90° C. or lower than −30° C., it is difficult to stabilize a condition of the formed body in the poor solvent.

In the next place, an ion-adsorbing device using a porous formed article according to the present invention as an adsorbent will be described.

A preferred embodiment on a method for removing phosphate ions in a solution will be described with reference to the drawings, but the present invention is not limited thereto.

The preferred embodiment will be now described with reference to FIG. 11.

At first, an adsorption step will be described.

Effluent discharged from a chemical plant, a food plant, a fertilizer plant or a sewage disposal plant is first temporarily stored in a raw-water storage tank 2 through a raw-water feed passage 1. Subsequently, it is supplied to a membrane separation device 5 which is a solid-liquid separation device, with the use of a channel 3 and a pump 4. The raw water from which a turbid component has been removed by the membrane separation device 5 is stored in pH-adjusting tank 8 through a channel 6. On the other hand, water in which the turbid component in the effluent has been concentrated by the membrane separation device 5 is returned to a raw-water storage tank 2 through a circuit 7. In the pH-adjusting tank 8, the pH of the sent raw water is adjusted to the pH of 2 to 7 which is pH range suitable for phosphate ions to be adsorbed, with the use of a mechanism 9 for adding pH-controlling agent.

The raw water of which the pH has been adjusted is supplied to a column 12 through a pipe 10 and a pump 11. In the column 12, phosphate ions included in effluent are contacted with a porous formed article according to the present invention, and are adsorbed by it. The purified effluent of which the ions in the solution has been adsorbed and removed by the porous formed article is temporarily stored in a treatment water tank 14 through a channel 13, and is discharged after the pH of the effluent has been neutralized into neutrality by a mechanism 15 for adding pH-controlling agent.

An ion-adsorbing device according to the present invention has a column 12 packed with a porous formed article according to the present invention and means for supplying a liquid to the column.

The means for supplying a liquid to the column is not limited in particular, and includes a pump, water head difference, suction and water spray.

In a water treatment apparatus according to the present invention, a solid-liquid separation device is not limited in particular, but includes a coagulation sedimentation equipment, a sand filter and a centrifugal dehydrator; and particularly preferably is a membrane separation device, because of saving a space and providing a clean filtrate. A preferred membrane separation technology includes a reverse osmosis membrane (RO), an ultrafiltration membrane (UF) and a microfiltration membrane (MF). A form of the membrane is not limited, and includes, for example, a flat membrane, a hollow fiber, a pleat, a spiral and a tube.

Subsequently, a back washing step will be described.

When an adsorption capacity of a porous formed article in a column 12 decreases, a valve c and a valve h are closed to stop the supply of raw water. Subsequently, the valve g and the valve b are opened, the treatment water in a treatment water tank 14 is supplied from a lower part of the column 12 through a channel 16 and a pump 17, and the porous formed article in the column 12 is decompressed and cleaned. A cleaning liquid is returned to pH-adjusting tank 8 through a channel 18.

A back washing step aims at cleaning a turbid component and dirt accumulated in a layer packed with a porous formed article in the column. When the packed layer is fastened, the fastened packed layer can be loosened by supplying air simultaneously with the back washing water.

In addition, in the back washing step, the liquid is absolutely supplied in a reverse direction of the direction of supplying the liquid in the adsorption step.

Next, a desorption step will be described.

When the adsorption capacity of a porous formed article in a column 12 decreases, an operation of desorbing adsorbed ions shall be performed. When the porous formed article adsorbs phosphate ions, an alkaline aqueous solution is employed as a desorption liquid. It is preferable to employ an alkaline aqueous solution of sodium hydroxide for the alkaline aqueous solution from the viewpoint of a cost and performance. Specifically, the aqueous solution of sodium hydroxide having been stored in a desorption liquid tank 19 is supplied to a column 12 through a channel 20 and a pump 21, is contacted with the porous formed article, elutes adsorbed phosphate ions into itself, and is stored in a crystallization tank 23 through a channel 22.

Subsequently, a crystallization step will be described.

The aqueous solution of sodium hydroxide having eluted phosphate ions in a desorption step is stored in a crystallization tank 23. In the crystallization tank 23, an operation of precipitating and recovering the eluted phosphate ions as calcium phosphate is performed. Specifically, a slurry of calcium hydroxide having been stored in the crystallizing-agent tank 24 is poured into an aqueous solution of sodium phosphate stored in the crystallization tank 23 through a channel 25 and a pump 26, and the mixed solution is stirred with a stirrer 27 to make both solutes react to crystallize calcium phosphate. After the crystallization reaction has been finished, a whitish liquid including crystallized calcium phosphate is supplied to a membrane separation device 30 which is a solid-liquid separation device, through a channel 28 and a pump 29, and is separated into a solid and a liquid. The slurry of calcium phosphate concentrated in the solid-liquid separation step is circulated into the crystallization tank 23 through a channel 31. The slurry of calcium phosphate concentrated in the crystallization tank 23 is discharged from a valve i, and is reused as a source of fertilizer. A clean alkaline aqueous solution (aqueous solution of sodium hydroxide) from which calcium phosphate has been separated as a solid from a liquid is stored in a desorption liquid tank 19 through a channel 32, and is reused in the next desorption step.

Here, the solid-liquid separation device includes coagulation sedimentation, a centrifugal dehydrator, a belt-press dehydrator and a membrane separation device; particularly preferably is the membrane separation device because of saving a space and providing a clean filtrate; and further preferably is a hollow-fiber-shaped ultrafiltration membrane (UF) and a microfiltration membrane (MF) because of having excellent stain resistance and producing a stable amount of a filtrate.

Next, an activation step will be described.

A porous formed article in a column after having finished a desorption step is alkaline, and in the state, has a low capability of adsorbing phosphate ions in raw water again. For this reason, an operation of returning pH-value in the column to a specified value, namely, activation treatment shall be performed with the use of an acidic aqueous solution.

An activation liquid (dilute sulfuric acid solution) in pH-adjusting tank 33 is supplied to the column 12 though a channel 34 and a pump 35, is contacted with the porous formed article in the column, and is circulated into the pH-adjusting tank 33 through a channel 36. The activation liquid having contacting with the porous formed article in the column 12 becomes alkaline, so that an activation liquid (sulfuric acid solution) stored in an activation liquid storage tank 38 is supplied to the pH-adjusting tank 33 through a channel 39, to control the pH into an acidic region with the use of a pump 40 engaged with pH controller 37 arranged in the pH-adjusting tank 33. The operation is repeated to adjust pH in the column 12 into the specified value. In addition, the activation liquid may be stirred with the use of a stirrer 41, in order to enhance the accuracy of pH control.

Figure 11:
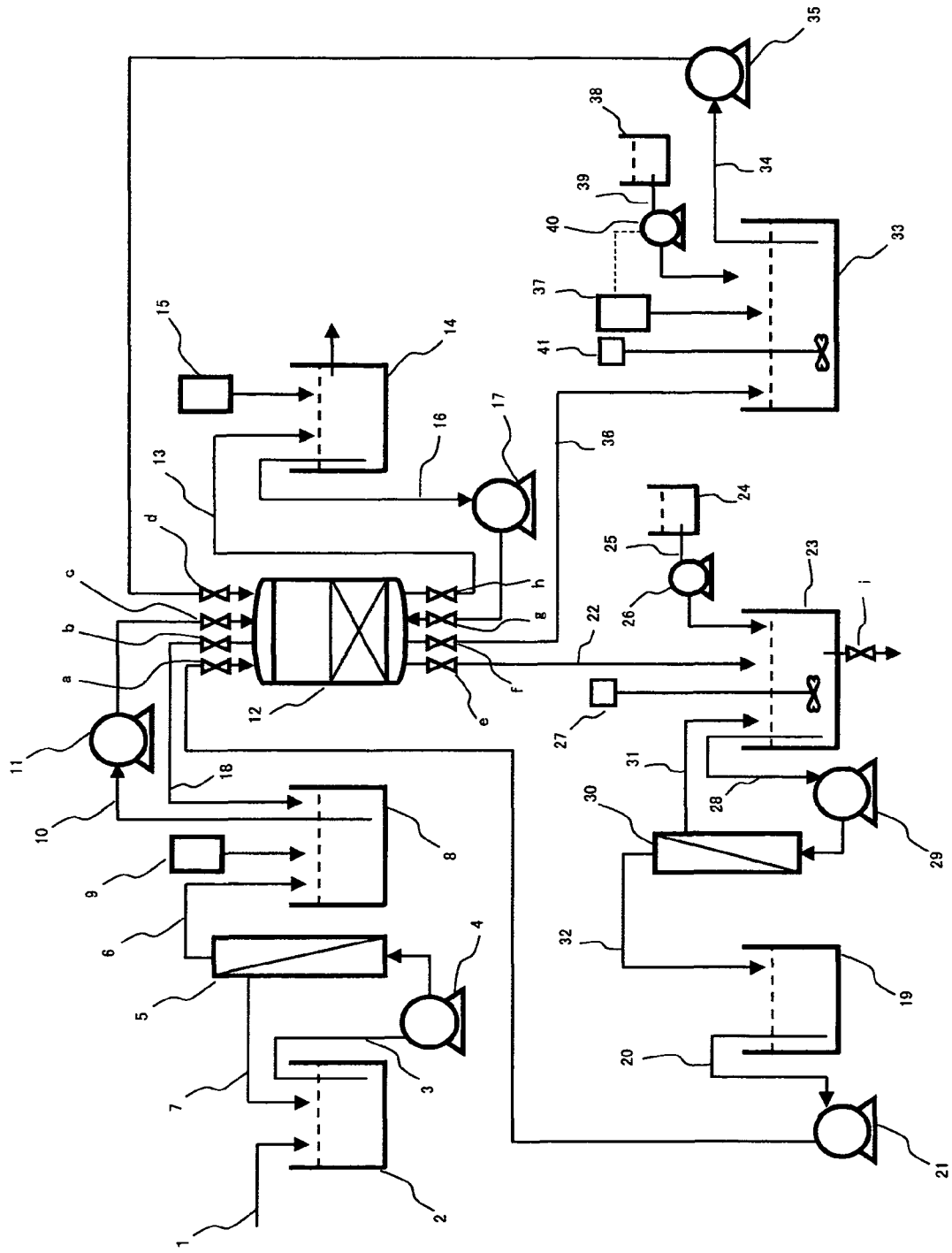
FIG. 11 is a water treatment apparatus showing Example 8 according to the present invention.

In addition, reference characters a, d, e and f also denote valves in FIG. 11.

By sequentially repeating the above described adsorption step, back washing step, desorption step, crystallization step and activation step, a compact and closed phosphate ion adsorption treatment device is realized.

In the next place, a method for treating ions by using a porous formed article according to the present invention as an adsorbent will be described.

The porous formed article according to the present invention is suitable for use as the adsorbent which is contacted with a liquid to adsorb and remove ions in water.

The liquid includes, for instance, drinking water, irrigation water, plant process water, river water, lake water, sea water, underground water, further sewage water and industrial waste water; an activated sludge of a sewage disposal plant and an effluent treatment facility; and treatment water for desulfurization flue gas in a thermal power plant.

An ion to be absorbed by the porous formed article according to the present invention is not limited in particular, and for example, may be any of a negative ion and a positive ion. The negative ion includes, for instance, ions of various organic acids, such as phosphor (phosphate ion), fluorine (fluoride ion), arsenic (arsenate ion and arsenite ion), boron (borate ion), iodine ion, chlorine ion, sulfate ion, nitrate ion, nitrite ion and acetate. In addition, the positive ion includes sodium, potassium, calcium, cadmium, lead, chromium, cobalt, strontium and cesium.

Particularly, an inorganic ion absorbing material has characteristics of showing specific selectivity to a specific ion, and accordingly is suitable for removing ions such as P, B, F and As out of a liquid in which the miscellaneous ions coexist, such as sewage water and industrial effluent.

Specifically, in order to remove the P, B, F and As ions, the inorganic ion absorbing material is preferably at least one compound selected from the group consisting of: a hydrated oxide of titanium, zirconium and tin; a hydrated ferrite of titanium, zirconium and tin; hydrated cerium oxide; hydrated lanthanum oxide; activated alumina; activated alumina impregnated with aluminum sulfate; and activated carbon impregnated with aluminum sulfate.

When a porous formed article according to the present invention is used as an adsorbent for water treatment, it is used in a form of being packed in a column and an adsorption tower.

The method of packing the porous formed article in the column or the adsorption tower and passing water to be treated through it and contacting water with the porous formed article can more sufficiently develop high contact efficiency that is a feature of the porous formed article according to the present invention, than other methods.

The column is a cylindrical vessel, and is provided with solid-liquid separation means such as a perforated plate and a mesh in at least one side of a lower part and an upper part, so that the formed article may not flow out.

A material of the column is not limited in particular, but includes stainless steel, FRP (reinforced plastic with glass fiber), glass and various plastics. In consideration of acid resistance, the inner surface can be lined with rubber or a fluororesin.

In an ion-adsorbing device and a method for treating ions according to the present invention, it is general to carry out a desorption operation and an activation operation described below in the same worksite as the absorption operation is performed. However, when there is no sufficient space in the worksite or a desorption operation is not frequently performed, only the column can be removed from the device and separately exchanged for a new column. The removed column can be separately treated in a plant well-equipped for desorption and activation steps, and be reused.

When a porous formed article according to the present invention is used as an adsorbent for water treatment, it is preferable to provide means for solid-liquid-separating a suspended solid in water as a pretreatment of the water treatment. The operation of removing the suspended solid in the water beforehand can prevent the clogging of the surface of the porous formed article, and can sufficiently make the porous formed article according to the present invention develop its adsorbing performance.

Preferred solid-liquid separation means includes coagulation sedimentation, settling separation, sand filtration and membrane separation. Particularly, a membrane separation technology is preferable because of requiring a small installation area and providing a clean filtrate. The preferred membrane separation technology includes a reverse osmosis membrane (RO), an ultrafiltration membrane (UF) and a microfiltration membrane (MF). A form of the membrane is not limited, and includes, for example, a flat membrane, a hollow fiber, a pleat, a spiral and a tube.

In an adsorption step according to the present invention, it is preferable to make an inorganic ion absorbing material adsorb ions to be adsorbed after having adjusted pH of a liquid to a preferred pH depending on the combination of the ions to be absorbed and a type of the inorganic ion absorbing material.

When phosphor in a liquid, for instance, is a substance to be adsorbed and the hydrated ferrite of zirconium is used in the inorganic ion absorbing material, the range of pH to be adjusted is pH of 1.5 to 10, and further preferably is pH of 2 to 7.

In addition, when boron in a liquid is a substance to be adsorbed, and the hydrated oxide of cerium oxide or the hydrated ferrite of zirconium is used for an inorganic ion exchanger, the range of pH to be adjusted is pH of 3 to 10, and further preferably is pH of 5 to 8.

In addition, when fluorine in a liquid is a substance to be adsorbed, and the hydrated oxide of cerium oxide or the hydrated ferrite of zirconium is used for an inorganic ion exchanger, the range of pH to be adjusted is pH of 1 to 7, and further preferably is pH of 2 to 5.

In addition, when arsenic in a liquid is a substance to be adsorbed, and the hydrated oxide of cerium oxide is used for an inorganic ion exchanger, the range of pH to be adjusted is pH of 3 to 12, and further preferably is pH of 5 to 9.

A porous formed article according to the present invention can again absorb (reuse) negative ions after having desorbed adsorbed negative ions by contacting itself with an alkaline aqueous solution, and subsequently having treated the adsorbent with an acidic aqueous solution. The porous formed article is thus reused to show an effect of reducing not only a cost but also waste. Particularly, the porous formed article according to the present invention is superior in durability, and accordingly is suitable for repeated use.

The alkaline solution can desorb the negative ions as long as the pH is in a range of 10 or higher, but the pH range is preferably 12 or higher, and further preferably is 13 or higher. The concentration of the alkaline solution is in a range of 0.1 to 30 wt. %, and further preferably is in a range of 0.5 to 20 wt. %. When the concentration is lower than 0.1 wt. %, the alkaline solution tends to decrease its desorption efficiency, and when the concentration is higher than 30 wt. %, the cost of an alkaline agent increases. A liquid-passing rate for an alkaline aqueous solution is not limited in particular, but is normally preferably in a range of 0.5 to 15($hr^{-1}$) by space velocity (SV). When the space velocity (SV) is lower than 0.5, the alkaline solution tends to take a long period of desorption time and make the operation inefficient. When the space velocity (SV) is higher than 15, the period of time in which the porous formed article contacts with the alkaline aqueous solution tends to be shortened, which decreases the desorption efficiency.

A type of the alkaline aqueous solution is not limited in particular, but inorganic alkalis such as aqueous solution of sodium hydroxide, an aqueous solution of potassium hydroxide and ammonium hydroxide, and organic amines are generally used. Among them, sodium hydroxide and potassium hydroxide are preferable in particular, because of showing high desorption efficiency.

The step of reusing desorption alkali and the step of recovering desorbed ions in the present invention make alkali reusable and enables the ions to be recovered as the precipitate, by contacting an alkaline aqueous solution with a porous formed article having adsorbed ions according to the present invention, making the ions eluted in the alkaline solution, adding such a crystallizing agent as to form a precipitate with objective ions to the eluent, and removing the precipitate.

The crystallizing agent includes a metal hydroxide. The hydroxide of metal produces a precipitate due to the coupling of a metal salt with negative ions such as phosphorus, boron, fluorine and arsenic. In addition, the hydroxide becomes an alkali source of the desorption liquid, and accordingly can make the system closed by recovering and recycling a regenerated solution. Specifically, the hydroxide of metal includes sodium hydroxide, aluminum hydroxide, magnesium hydroxide and calcium hydroxide.

Among them, the hydroxide of a polyvalent metal is preferable because of forming a hardly soluble precipitate, namely, a precipitate with low solubility, so that specifically, aluminum hydroxide, magnesium hydroxide and calcium hydroxide are particularly preferable. Particularly, calcium hydroxide is preferable from the viewpoint of a cost.

For instance, when fluorine exists in an eluent as sodium fluoride, a high concentration of alkali can be recovered according to the following reaction formula.

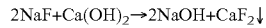

$$2NaF + Ca(OH)_2 \rightarrow 2NaOH + CaF_2 \downarrow$$

Similarly, when phosphor exists in a solution as sodium phosphate, alkali can be recovered according to the following reaction formula. Furthermore, crystallized calcium phosphate can be reused as a fertilizer and the like.

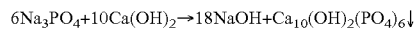

$$6Na_3PO_4 + 10Ca(OH)_2 \rightarrow 18NaOH + Ca_{10}(OH)_2(PO_4)_6 \downarrow$$

An amount of the hydroxide of metal to be added is not limited in particular, but is 1 to 4 times weight equivalent to objective ions. When the amount of the added oxide is equimolar or less to the objective ions, the efficiency of removing precipitation tends to decrease, when the amount of the added oxide is more than 4 times equivalent to the objective ions, the amount is economically disadvantageous because the removing efficiency does not almost change.

The pH of a solution from which the objective ions are to be precipitated and removed is preferably 6 or higher, and when considering to recover an alkaline aqueous solution and reuse it, the pH is kept 12 or higher and preferably is kept 13 or higher. When the pH of the solution from which the objective ions are to be precipitated and removed is lower than 6, the solubility of a precipitate increases to decrease precipitation efficiency.

When precipitating and removing the objective ions, it is also recommended to concurrently use an inorganic flocculating agent such as aluminum sulfate and polyaluminum chloride and a high polymer flocculating agent, in addition to the hydroxide of metal.

A method of solid-liquid separating a precipitate in an eluant according to the present invention is preferably a membrane separation method.

The membrane separation method is suitable for a closed system such as in the present invention, because of needing a small installation area and providing a clean filtrate.

The membrane separation method is not limited in particular, but includes an ultrafiltration membrane (UF), a microfiltration membrane (MF) and a permeable membrane. A form of the membrane is not limited, and includes, for example, a flat membrane, a hollow fiber, a pleat, a spiral and a tube. Among them, the ultrafiltration membrane (UF) and the microfiltration membrane (MF) are preferred membrane separation methods, in point of a filtering speed and filtration accuracy.

A porous formed article in a column after a desorption step has been finished is alkaline, and in the state, has a low capability of adsorbing ions in raw water again. For this reason, an operation of returning pH in a column to a specified value with the use of an acid aqueous solution, namely, activation treatment is performed.

An acid aqueous solution is not limited in particular, but an aqueous solution such as sulfuric acid and hydrochloric acid is used. The concentration of the acid aqueous solution has only to be about 0.001 to 10 wt. %. When the concentration is lower than 0.001 wt. %, the activation step needs a large volume of water before it will be finished, and when the concentration is higher than 10 wt. %, it is feared that the acid aqueous solution may cause a problem with danger in handling.

A liquid-passing rate for the acidic aqueous solution is not limited in particular, but is normally preferably in a range of 0.5 to 30($hr^{-1}$) by space velocity (SV). When the space velocity (SV) is lower than 0.5, the acidic solution tends to take a long period of activation time and make the operation inefficient. When the space velocity (SV) is higher than 30, the period of time in which the porous formed article contacts with the acidic aqueous solution is shortened, which decreases the desorption efficiency.

A further preferred activation method is to activate the porous formed article while circulating an active liquid between the column and pH-adjusting tank.

By adopting the configuration, it becomes possible to mildly return the pH of a porous formed article in a column, which has been shifted to an alkaline side during a desorption operation, to predetermined pH in consideration of acid resistance of an inorganic ion absorbing material.

For instance, it is known that iron oxide remarkably dissolves in an acidic solution with pH of 3 or lower. A conventional activation method of activating the porous formed article supporting the above described iron oxide thereon had a problem of the above described dissolution of iron, and accordingly could not help treating the porous formed article with a weak acid of pH 3 or lower. However, the method requires a large volume of water, and is not economically permissible.

In contrast to such a conventional method, an activation method according to the present invention includes arranging a column and pH-adjusting tank, circulating an activation liquid between them, accordingly can activate the porous formed article while avoiding the pH range in which iron oxide dissolves in acid, further can reduce the volume of water used for the activation, and can downsize the apparatus.

A liquid-passing rate for the acidic aqueous solution is selected from a range of 1 to 200($hr^{-1}$) by space velocity (SV), and is further preferably from a range of 10 to 100 by space velocity (SV). When the space velocity (SV) is lower than 1, the acidic solution tends to take a long period of activation time and make the operation inefficient. When the space velocity (SV) is higher than 200, the activation step requires a large pump power and tends to result in inefficiency.

A series of these operations of desorption and activation can be performed in a state that an adsorbent is packed in the column. Specifically, the regenerating operations can be performed by sequentially passing an alkaline aqueous solution and an acid aqueous solution to the column packed with an adsorbent, for which the adsorption operation has been finished. In the operations, a liquid-passing direction may be an upward direction or a downward direction.

A porous formed article according to the present invention has superior chemical resistance and mechanical strength, and accordingly does not almost lower its adsorbing performance for ions even when the regeneration process has been repeated several tens of times to several hundreds of times.

In the next place, an application field of a porous formed article according to the present invention other than the use for water treatment will be described.

The porous formed article according to the present invention has a feature of having a high opening rate at the surface of the formed article, communicating pores inside the formed article, which develops in a three-dimensional network form, further porosity in the fibril as well which forms the communicating pores, and consequent high contact efficiency.

The application of taking advantage of the high contact efficiency includes an adsorbent, a deodorant, an antimicrobial agent, a moisture absorbent, an agent for maintaining food freshness, an enzyme immobilization carrier and a chromatographic carrier.

For instance, when zeolite is employed for the inorganic ion absorbing material, a deodorization effect can be expected. Furthermore, when the porous formed article according to the present invention employs zeolite for the inorganic ion absorbing material and makes silver supported on the zeolite, the porous formed article shows an antimicrobial property.

In addition, when the porous formed article makes palladium or platinum supported on the zeolite, the porous formed article can be used as the agent for maintaining freshness, because it adsorbs ethylene.

In addition, when the porous formed article makes silver or copper supported on the zeolite, the porous formed article shows a deodorization effect, because it can adsorb and decompose an offensive odor gas such as hydrogen sulfide, ammonia and methyl mercaptan.

In any case, it can be expected that the porous formed article according to the present invention shows the effect which a conventional technology does not possess, while taking the advantage of the high contact efficiency.

In the next place, the present invention will be further described in detail with reference to examples, but the present invention is not limited thereby at all.

In the examples, various physical properties on a formed article were measured in a method described below.

Observation of Formed Article with Scanning Electron Microscope

The formed article was observed with an S-800 type scanning electron microscope made by Hitachi, Ltd., which is a scanning electron microscope (SEM).

Cutting of Formed Article

The formed article was vacuum-dried at a room temperature, and the dried formed article was added with isopropyl alcohol (IPA) to be impregnated with IPA. Then, the formed article was sealed in a gelatin capsule with a diameter of 5 mm together with IPA, and the sealed formed article was frozen in liquid nitrogen. The frozen formed article was cut with a chisel, together with the capsule. The cut formed article was selected, and suitable one was used as a specimen for microscopy.

Opening Ratio at Surface

An image of the surface of the formed article was obtained by taking a photograph of the surface with the scanning electron microscope, and analyzing the photograph with the use of an image-analyzing software (WinROOF (trade name) made by Mitani Corp.).

In more detail, the opening rate at the surface was determined by the steps of; making the software recognize the obtained SEM image; manually adjusting a threshold level so that a shade part can be recognized as an opening part and a light part can be recognized as a fibril; and making the software divide the image into the opening part and the a fibril part, and calculate the area ratio.

Opening Diameter at Surface

An opening diameter at the surface was determined by measuring it actually from the image of the surface of the formed article photographed with the use of the scanning electron microscope. When the pore has a circular shape, the diameter of the opening was used as the pore diameter, and when the pore has other shape than the circular shape, the circle-equivalent diameter of a circle having the same area was used as the pore diameter.

Particle Diameter

Particle diameters of a formed article and an inorganic ion absorbing material were measured with a laser diffraction/scattering-type particle size distribution measuring device (LA-910 (trade name) made by HORIBA Corp.). However, when the particle diameter was 1,000 μm or larger, the particle diameter was decided to be the average value of the maximum diameter and the minimum diameter of the formed article, by measuring the diameters with the use of the SEM image.

Porosity

The weight (W1) of a formed article in a hydrated state was determined by spreading a sufficiently moistened formed article on dry filter paper to remove excessive moisture, and measuring the weight. Next, the formed article was vacuum-dried under room temperature for 24 hours to obtain the dried formed article. The weight of the dried formed article was measured and was decided to be the weight (W0) of the formed article in a dried state.

Subsequently, a pycnometer (Gay-Lussac type with capacity of 10 ml) was prepared, and the weight of the pycnometer packed with the pure water (25° C.) was measured, which was decided to be the weight (Ww) in a state that the pycnometer is packed with water. Then, the formed article in a state of getting wet in the pure water was charged in the pycnometer, the pure water was further packed up to a marked line, and the weight was measured and decided as (Wwm). Subsequently, the dried formed article was obtained by taking out the formed article from the pycnometer, and vacuum-drying it under room temperature for 24 hours. The weight of the dried formed article was measured and was decided as (M). A specific gravity (ρ) and a porosity (Pr) of the formed article were determined According to the following computation expressions:

$$\rho = M/(Ww+M-Wwm)$$

$$Pr = (W1-W0)/(W1-W0+W0/\rho) \times 100,$$

wherein Pr is the porosity (%); W1 is the weight (g) of the formed article in the hydrated state; W0 is the weight (g) of the formed article after having been dried; ρ is the specific gravity (g/cm$^3$) of the formed article; M is the weight (g) of the formed article after having been dried; Ww is the weight (g) of the pycnometer which is packed with water; and Wwm is the weight (g) of the pycnometer which contains the formed article in the hydrated state and pure water.

Supported Amount

A dried formed article was obtained by vacuum-drying a formed article under room temperature for 24 hours. The weight of the dried formed article was measured, and was decided to be the weight Wd (g) of the formed article in a dried state. Subsequently, the dried formed article was baked with the use of an electric furnace at 800° C. for two hours, and the weight of the ash was measured and was decided to be the weight Wa (g) of the ash. A supported amount was determined in the following expression:

Supported amount (%)=Wa/Wd×100, wherein Wa is the weight (g) of the ash in the formed article; and Wd is the weight (g) of the formed article in a dried state.

Specific Surface Area (m$^2$/cm$^3$)

A specific surface area $S_{BET}$ (m$^2$/g) of the porous formed article was determined by BET method with the use of Coulter SA3100 (trade name) made by Beckman Coulter, Inc., after the formed article was vacuum-dried at room temperature.

Next, an apparent volume V (cm$^3$) of a formed article in a wet condition was measured with the use of a measuring cylinder or the like. Subsequently, the formed article was vacuum-dried at room temperature, and the weight W (g) was determined.

A specific surface area of the formed article according to the present invention was determined from the following expressions:

Specific surface area (m$^2$/cm$^3$)=$S_{BET}$×bulk density (g/cm$^3$)

Bulk density (g/cm$^3$)=W/V, wherein $S_{BET}$ represents the specific surface area (m$^2$/g) of the formed article; W represents the weight (g) of the dried formed article; and V represents the apparent volume (cm$^3$).

Measurement of Phosphor Concentration

The phosphor concentration was measured with the use of a phosphate analyzer Phosphax Compact (trade name) made in HACH Company.

Measurement of Boron Concentration

The boron concentration was measured by ICP spectrometry (IRIS-INTREPID-II made by Thermo Electron Corp (U.S.A.)).

Measurement of Arsenic Concentration

The arsenic concentration was measured by ICP spectrometry (IRIS-INTREPID-II made by Thermo Electron Corp (U.S.A.)).

Measurement of Fluorine Concentration

The fluorine concentration was measured with the use of ion chromatography (made by Hitachi, Ltd.).

Turbidity

The turbidity was measured by an SS densitometer (SSD-10, made by DKK-Toa Corporation).

Calcium Ion Concentration

The calcium ion concentration was measured with the use of DR890 (calmagite calorimetric method) made by HACH company.

At first, a production example for a powder of an inorganic ion absorbing material will be described.

PRODUCTION EXAMPLE 1

Production for Powder of Hydrated Ferrite of Zirconium

One liter of 0.15 mol aqueous solution of zirconium sulphate was prepared. The solution contained metallic ions of 13.7 g as zirconium. Ferrous sulfate crystal (FeSO$_4$.7H$_2$O) in an amount of 84.0 g was added and dissolved into the aqueous solution which was being stirred. The amount of added ferrous sulfate corresponds to 0.3 mol of ferrous ions. Next, 15 wt. % sodium hydroxide solution was added dropwise to the aqueous solution which was being stirred, till the pH of the solution reached 10, and then a bluish green precipitate was produced. Subsequently, air was blown into the aqueous solution which was being kept at 60° C., at the flow rate of 10 liter/hour. When air is continuously blown into the solution, the pH of the aqueous solution decreases. When it happened, the 15 wt. % sodium hydroxide solution was added dropwise into the aqueous solution to keep it to pH of 9.5 to 10. After air had been continuously blown into the solution till the decrease of pH was not recognized, the black precipitate of hydrated ferrite of zirconium was produced. Subsequently, the black precipitate was suction-filtrated, was washed with deionized water till the filtrate became neutral, and then was dried at 70° C. or lower. The dried precipitate was pulverized in a ball mill for seven hours, and the powder of the hydrated ferrite of zirconium with an average particle diameter of 2.5 µm was obtained.

PRODUCTION EXAMPLE 2

Production for Powder of Hydrated Cerium Oxide

Ceric sulfate in an amount of 0.2 mols and ammonium sulfate in an amount of 0.5 mol were dissolved in 2 liters of distilled water which was being stirred. Subsequently, ammonia water was added to adjust the pH of the solution to 9, and a precipitate was obtained. The solution was matured overnight and was filtrated, and the precipitate was washed with deionized water till a filtrate became neutral, and then was dried at 60° C. The dried precipitate was pulverized in a ball mill for seven hours, and the powder of the hydrated cerium oxide with an average particle diameter of 2.0 µm was obtained.

EXAMPLE 1

Ethylene-vinylalcohol copolymer (EVOH, Nippon Synthetic Chemical Industry Co., Ltd., Soarnol E3803 (trade name) in an amount of 10 g, polyvinylpyrrolidone (PVP, BASF Japan Co., Ltd., Luvitec K30 Powder (trade name) in an amount of 10 g and dimethylsulfoxide (DMSO, Kanto Chemical Co., Ltd.) in an amount of 80 g were dissolved in water heated to 60° C. in a separable flask, and a homogenous polymer solution was obtained.

Into the polymer solution in an amount of 100 g, the powder of the inorganic ion absorbing material in an amount of 92 g prepared in Production Example 1 was added, and the mixture was adequately mixed to form slurry.

The obtained composite macromolecule slurry was heated to 40° C. and supplied into a cylindrical rotating vessel having a nozzle with a diameter of 5 mm opened on the side face. Then, the vessel was rotated to form a droplet through the nozzle by a centrifugal force (15G), and the droplet was discharged into a solidification bath accommodating water of 60° C. therein, and the composite macromolecular slurry was solidified. Furthermore, the solidified article was cleaned and classified to form a spherical formed article with an average particle diameter of 623 μm.

The physical properties are shown in Table 1.

Furthermore, the surface and the torn surface of the obtained formed article were observed with the use of a scanning electron microscope (SEM). The result is shown in FIGS. 3 to 6.

Figure 3:
FIG. 3 is an electron microscope photograph (with magnification of 150 times) showing the torn surface of a formed article in Example 1.
Figure 4:
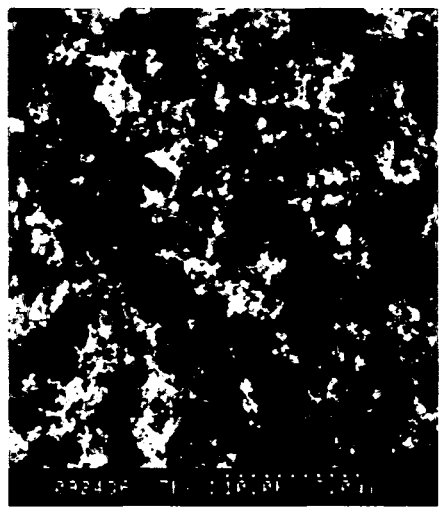
FIG. 4 is an electron microscope photograph (with magnification of 10,000 times) showing the surface of a formed article in Example 1.
Figure 6:
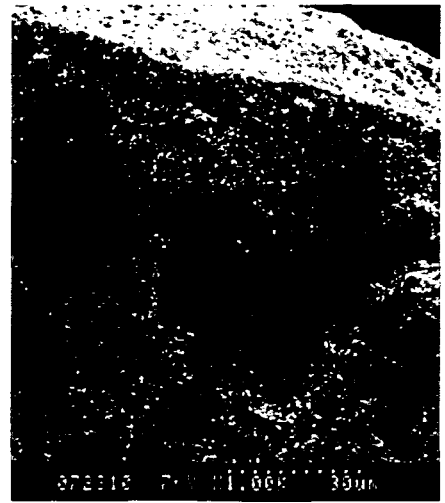
FIG. 6 is an electron microscope photograph (with magnification of 1,000 times) showing the torn surface of a formed article in Example 1.

It was observed in FIG. 3 and FIG. 6 that the obtained formed article has a layer having the maximum pore diameter (void layer) in the vicinity of the surface, so as to form a concentric circle.

Figure 5:
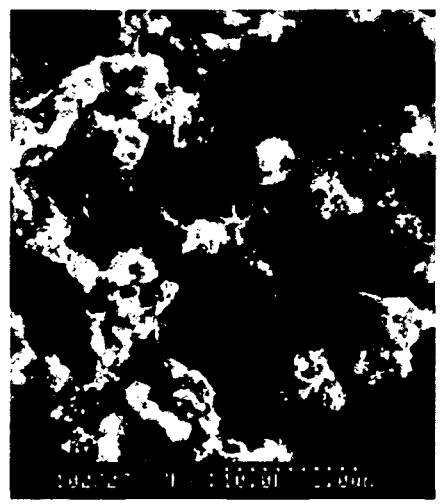
FIG. 5 is an electron microscope photograph (with magnification of 10,000 times) showing the torn surface of a formed article in Example 1.

As is shown in FIG. 5, it was also confirmed that cavities exist in a fibril and apertures exist on the surface of a fibril, and it was further observed that the powder of an inorganic ion absorbing material is supported on the outer surface of the fibril and on the surface of the cavities in the fibril.

TEST EXAMPLE 1

A content of polyvinylpyrrolidone (PVP) which is a water-soluble polymer in a formed article prepared in Example 1 was measured in the way described below.

At first, the formed article prepared in Example 1 was vacuum-dried, and the weight Wd (g) was determined. Next, the dried formed article was pulverized with the use of a mortar. Subsequently, the pulverized body was subjected to Soxhlet extraction with the use of chloroform, and polyvinylpyrrolidone was extracted. Then, the obtained extract was evaporated to dryness, and the weight Ws (g) of polyvinylpyrrolidone was measured. The content of the water-soluble polymer was determined by the following expression:

Content (%)=$Ws/Wd \times 100$

The content of the water-soluble polymer (polyvinylpyrrolidone) was 0.1%.

In addition, the substance evaporated to dryness was confirmed to be polyvinylpyrrolidone from an infrared absorption spectrum (IR) on the substance.

EXAMPLE 2

Ethylene-vinylalcohol copolymer (EVOH, Nippon Synthetic Chemical Industry Co., Ltd., Soarnol E3803 (trade name) in an amount of 10 g, polyvinylpyrrolidone (PVP, BASF Japan Co., Ltd., Luvitec K30 Powder (trade name) in an amount of 10 g and dimethylsulfoxide (DMSO, Kanto Chemical Co., Ltd.) in an amount of 80 g were dissolved in water heated to 60° C. in a separable flask, and a homogenous polymer solution was obtained.

Into the polymer solution in an amount of 100 g, the powder of hydrated cerium oxide in an amount of 125 g was added, which was an inorganic ion absorbing material prepared in Production Example 2, and the mixture was adequately mixed to form slurry.

The obtained composite macromolecule slurry was heated to 40° C., and was supplied into a cylindrical rotating vessel having a nozzle with a diameter of 5 mm opened on the side face. Then, the vessel was rotated to form a droplet through the nozzle by centrifugal force (17.5G), the droplet was discharged into a solidification bath accommodating water of 60° C. therein, and the composite macromolecular slurry was solidified. Furthermore, the solidified article was cleaned and classified to form a spherical formed article with an average particle diameter of 531 μm. The physical properties are shown in Table 1.

Furthermore, the surface and the torn surface of the obtained formed article were observed with the use of a scanning electron microscope (SEM). The result is shown in FIGS. 1 to 2 and 7 to 10.

Figure 7:
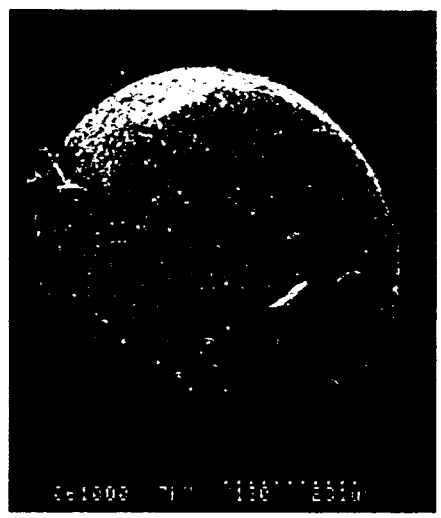
FIG. 7 is an electron microscope photograph (with magnification of 130 times) showing the torn surface of a formed article in Example 2.
Figure 8:
FIG. 8 is an electron microscope photograph (with magnification of 10,000 times) showing the surface of a formed article in Example 2.
Figure 10:
FIG. 10 is an electron microscope photograph (with magnification of 1,000 times) showing the torn surface of a formed article in Example 2.

It was observed in FIG. 7 and FIG. 10 that the obtained formed article has a layer having the maximum pore diameter (void layer) in the vicinity of the surface.

Figure 9:
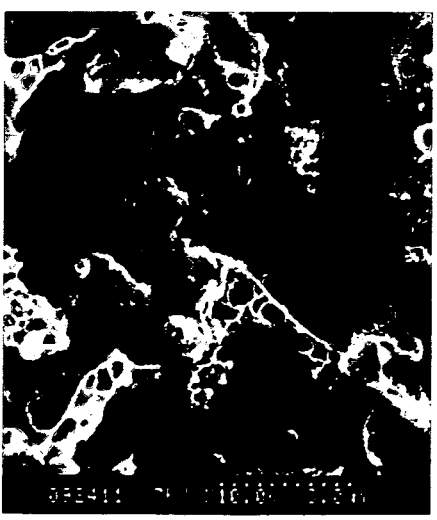
FIG. 9 is an electron microscope photograph (with magnification of 10,000 times) showing the torn surface of a formed article in Example 2.

As is shown in FIG. 9, it was also confirmed that cavities exist in a fibril and apertures exist on the surface of a fibril, and it was further observed that the powder of an inorganic ion absorbing material is supported on the outer surface of the fibril and on the surface of the cavities in the fibril.

EXAMPLE 3

Phosphor Adsorption Test

A model liquid, namely, a stock solution to be adsorbed was prepared by dissolving trisodium orthophosphate ($Na_3PO_4 \cdot 12H_2O$) in distilled water to prepare a liquid with a phosphorus concentration of 9 mg-P/liter, and adjusting the pH of the liquid to 7 with sulfuric acid.

A formed article in an amount of 8 ml prepared in Example 1 and Example 2 was charged in a column (with inside diameter of 10 mm), and the above described stock solution to be adsorbed was passed therethrough at a rate of 240 ml/hr (30 by space velocity (SV)). An effluent (treated liquid) from a column was sampled every 30 minutes, the concentration of phosphate ions (concentration of phosphor) in the treated water was measured, and an amount of water having had passed therethrough (adsorbed amount) before the concentration of phosphate ions exceeded 0.5 mg-P/liter (ppm) was determined. The results are shown in Table 1.

After the above described adsorption operation, the formed article was immersed in 7 wt. % aqueous solution of sodium hydroxide for two hours to desorb adsorbed phosphoric acid, and then was washed with distilled water. Subsequently, the formed article was immersed in 0.1 wt. % aqueous solution of sulfuric acid for five hours, and was thus regenerated. Then, the formed article was washed again with distilled water.

The above described operations of adsorption, desorption and regeneration were repeated 50 times, and the adsorbed amount after the first and 50th operations and the rate of change between them were examined.

The above rate of the change in the adsorbed amount is expressed by the following expression:

Rate of change of adsorbed amount=(amount at 50th adsorption operation)/(amount at first adsorption operation)×100.

The results are shown in Table 1. Adsorbing capacity at the 50th operation did not change from that at the first operation, which identified that the present adsorbent has high durability.

COMPARATIVE EXAMPLE 1

A formed article was prepared by the same method as in Example 1 except that polyvinylpyrrolidone which is a water-soluble polymer was not used.

The physical properties are shown in Table 1. The formed article had a skin layer, had an opening ratio of 2% at the surface, and had as poor opening rate at the surface as was shown by the opening diameter of 0.01 to 0.5 μm. In addition, the formed article did not show observable cavities in a fibril and apertures on the fibril surface.

The formed article was subjected to an adsorption test for phosphor as in the case of Example 3. The results are shown in Table 1. The formed article was identified to have adsorbed a small amount of phosphor, after having had been tested at the space velocity (SV) of 30.

COMPARATIVE EXAMPLE 2

Cellulose fibers containing hydrated zirconium oxide was prepared with an impregnation method which is the same method as described in Example 3 of Patent Document 2 (JP-A-2002-38038).

As a result of having determined a rate of a change of an adsorbed amount after having had repeated 50 operations of adsorption, desorption and regeneration in a beaker with the use of an adsorption stock solution, a desorption liquid and a regeneration liquid in the same way as in Example 3, the value was 50%, which identified that the formed article prepared with the impregnation method had low durability.

EXAMPLE 4

Boric Acid Adsorption Test

Boric acid ($H_3BO_3$) was dissolved in distilled water to form an aqueous solution of boric acid (22 mg-B/liter as boron), and the pH of the solution was adjusted to 3, 5 and 7 with the use of sulfuric acid and sodium hydroxide. To the aqueous solution in the amount of 1 liter, each 2 ml of porous formed articles prepared in Examples 1 and 2 was added, and the mixture was stirred in a shaker. Two hours later after having started being stirred, the aqueous solution was sampled, the concentration of boric acid was measured, and the amount of adsorbed boric acid was determined. The results are shown in Table 2.

It was found that borate ions are much adsorbed in a neutral region.

EXAMPLE 5

Fluorine Adsorption Test

Sodium fluoride (NaF) was dissolved in distilled water to form an aqueous solution of fluoride ion (38 mg-F/liter as fluorine), and the pH of the solution was adjusted to 3, 5 and 7 with the use of sulfuric acid and sodium hydroxide.

As in the case of Example 4, to the aqueous solution in the amount of 1 liter, each 2 ml of porous formed articles prepared in Examples 1 and 2 was added, and the mixture was stirred in a shaker. Two hours later after having started being stirred, the aqueous solution was sampled, the concentration of fluoride ion was measured, and the amount of adsorbed fluoride ion was determined. The results are shown in Table 2.

It was found that fluoride ions are much adsorbed in an acidic region. Accordingly, it is effective for fluoride ions to be adjusted into pH in an acidic side as pretreatment.

EXAMPLE 6

Arsenic Adsorption Test

Arsenous acid ($As_2O_3$) was dissolved in distilled water to form an aqueous solution of arsenite ion (150 mg-As/liter as arsenic), and the pH of the solution was adjusted to 3, 5 and 7 with the use of sulfuric acid and sodium hydroxide.

As in the case of Example 4, to the aqueous solution in the amount of 1 liter, each 2 ml of porous formed articles prepared in Examples 1 and 2 was added, and the mixture was stirred in a shaker. Two hours later after having started being stirred, the aqueous solution was sampled, the concentration of arsenite ion was measured, and the amount of adsorbed arsenite ion was determined. The results are shown in Table 2.

The arsenite ions did not show difference among adsorbed amounts, in any pH of an acidic region.

EXAMPLE 7

Water sampled from river was filtrated through a microfiltration membrane (made by Asahi Kasei Chemicals Co., Ltd., microfiltration membrane with nominal pore diameter of 0.1 μm). Turbidities of raw water before filtration and treated water after filtration were measured. In addition, a model liquid was prepared by dissolving trisodium orthophosphate ($Na_3PO_4.12H_2O$) in distilled water to prepare a liquid with a phosphorus concentration of 1 mg-P/liter, and adjusting the pH of the liquid to 7 with sulfuric acid.

A formed article in the amount of 8 ml prepared in Example 1 was charged in a column (with inside diameter of 10 mm), and the above described adsorption stock solution was passed therethrough at a rate of 80 ml/hr (10 by space velocity (SV)). An effluent (treated liquid) from a column was sampled every 30 minutes, the concentration of phosphate ions (concentration of phosphor) in the treated water was measured, and a period of time having had passed therethrough before the concentration of phosphate ions exceeded 0.1 mg-P/liter (ppm) was determined.

As a result, it took 20 days before the phosphorus concentration in treated water exceeded 0.1 mg-P/liter. In the period, turbidity before filtration stayed in between the maximum value of 16 and the minimum value of 0.8, and in the average value of 2.4. The turbidity of treated water after filtration was 0.1 or less.

The formed article stably showed the performance of removing phosphorus by previously removing a turbid component by filtration through a membrane.

COMPARATIVE EXAMPLE 3

An adsorption test was carried out in the same method as in Example 7 except that the water sampled from river was not filtrated through a microfiltration membrane. As a result, the phosphorus concentration of treated water started occasionally exceeding 0.1 mg-P/liter in about 10 days after water-passing was started, so that the stable treated water was not obtained. It is thought that this is because a turbid component in river water irregularly plugged the surface of the porous formed article and the space between particles, because the river water was not treated with the membrane.

EXAMPLE 8

An example of a water treatment apparatus according to the present invention is shown in FIG. 11.

At first, an adsorption step will be described with reference to FIG. 11.

The treatment water which had been treated through activated sludge and settlement in an effluent treatment facility of a food factory was temporarily stored in a raw-water storage tank 2 through a raw-water feed passage 1.

As for the quality of the raw water, turbidity stayed in between the maximum value of 20 and the minimum value of 3, and in the average value of 5.1. Phosphate ion concentration almost stably stayed in 150 mg-P/liter.

Subsequently, the stored water was filtrated with a membrane separation device 5 (microfiltration membrane with nominal pore diameter of 0.1 μm made by Asahi Kasei Chemicals Corp.) through a channel 3 and a pump 4, and the filtrate was stored in pH-adjusting tank 8.

As for the quality of the filtrated water, a turbid component was removed to show the turbidity less than 0.1, but the concentration of phosphate ions did not change.

The stored water in the pH-adjusting tank 8 was adjusted to pH 3 by sulfuric acid added with the use of a mechanism 9 for adding pH-controlling agent.

The raw water having the pH adjusted was supplied to a column 12 through a pipe 10 and a pump 11. The raw water was passed through the column 12 in which 2 L of the porous formed article prepared in Example 1 was charged, at the rate of 20 liter/hr (10 by space velocity (SV)).

The purified effluent of which the phosphate ions had been adsorbed and removed by the porous formed article was temporarily stored in a treatment water tank 14 through a channel 13, and was discharged after the pH of the effluent had been neutralized into neutrality by sodium hydroxide added with the use of a mechanism 15 for adding pH-controlling agent.

The concentration of phosphate ions in the treated water was 0.1 mg-P/liter or lower.

Next, a back washing step will be now described.

When the concentration of phosphate ions in the treated water had exceeded 0.5 mg-P/liter, a valve c and a valve h were closed to stop the supply of the raw water. Subsequently, the valve g and the valve b was opened, the treated water in a treatment water tank 14 was supplied from a lower part of the column 12 through a channel 16 and a pump 17 at the rate of 60 liter/hr (30 by space velocity (SV)), and the porous formed article in the column 12 was decompressed and cleaned. A cleaning liquid was returned to pH-adjusting tank 8 through a channel 18.

Next, a desorption step will be described.

An aqueous solution of sodium hydroxide with the concentration of 5 wt % having had been stored in a desorption liquid tank 19 was supplied to a column 12 through a channel 20 and a pump 21 at the rate of 2 liter/hr (1 by space velocity (SV)) for six hours, was contacted with a porous formed article, eluted adsorbed phosphate ions into the aqueous solution of sodium hydroxide, and was stored in a crystallization tank 23 through a channel 22.

At this time, the concentration of the phosphate ions in the crystallization tank 23 was 570 mg-P/liter.

Subsequently, a crystallization step will be described.

A slurry of calcium hydroxide in the concentration of 3 g/liter in terms of calcium hydroxide having had been stored in the crystallizing-agent tank 24 was poured into an aqueous solution of sodium phosphate stored in the crystallization tank 23 through a channel 25 and a pump 26, and the mixed solution was stirred with a stirrer 27 for 20 hours to make both solutes react to crystallize calcium phosphate. After the crystallization reaction had been finished, a whitish liquid including crystallized calcium phosphate was supplied to a membrane separation device 30 which was a membrane separation device (ultrafiltration membrane with nominal molecular cut-off of 6,000, made be Asahi Kasei Chemicals Corp.), through a channel 28 and a pump 29, and was separated into a solid and a liquid. The aqueous solution of sodium hydroxide after having had been separated into the solid and the liquid contained phosphate ions with the concentration of 10 mg-P/liter and calcium ions with the concentration of 1 mg-Ca/liter.

The concentrated slurry of calcium phosphate by having had been separated into the solid and the liquid was circulated to the crystallization tank 23 through the channel 31. The concentrated slurry of calcium phosphate in the crystallization tank 23 was discharged from a valve i.

Next, an activation step will be described.

The activating solution of in an amount of 10 liters, which had been adjusted to pH 3 with sulfuric acid in pH-adjusting tank 33, was prepared. The activating solution was supplied to a column 12 through a channel 34 and a pump 35 at the rate of 120 liter/hr (60 by space velocity (SV)), was contacted with a porous formed article in the column, and was circulated to the pH-adjusting tank 33 through a channel 36. The activation liquid having had contacting with the porous formed article in the column 12 became alkaline, so that 50 wt. % aqueous solution of sulfuric acid stored in an activation liquid storage tank 38 was supplied to the pH-adjusting tank 33 through a channel 39, to control the pH into 3 to 5 with the use of a pump 40 engaged with pH controller 37 arranged in the pH-adjusting tank 33. The operation was repeated for 9 hours to stabilize pH in the column 12 into 5. The activation liquid was stirred with the use of a stirrer 41, in order to enhance the accuracy of pH control.

Though the above described adsorption step, back washing step, desorption step, crystallization step and activation step were sequentially repeated 30 times, an adsorbed amount did not change.

TABLE 1

| Physical property | Example 1 | Example 2 | Comparative Example 1 |
|---|---|---|---|
| Average particle diameter (μm) | 623 | 531 | 600 |
| Porosity (%) | 79 | 79 | 76 |
| Opening diameter (μm) at surface | 0.1~10 | 0.1~20 | 0.01~0.5 |
| Supported amount (%) | 81 | 89 | 81 |
| Opening ratio (%) at surface | 54 | 30 | 2 |
| Specific surface area ($m^2/cm^3$) | 62 | 84 | 67 |
| Presence or absence of skin layer | absence | absence | presence |
| Cavity in fibril | presence | presence | absence |
| Aperture at fibril surface | presence | presence | absence |
| Adsorbed amount (mg-P/liter) in first operation | 900 | 1000 | 300 |
| Adsorbed amount (mg-P/liter) in 50th operation | 880 | 950 | 285 |
| Rate (%) of change of adsorbed amount (%) | 98 | 95 | 95 |

TABLE 2

| Adsorbent | Amount of adsorbed ions | pH 3 | pH 5 | pH 7 |
|---|---|---|---|---|
| Example 1 | Amount of adsorbed boron (g-B/liter) | 0.1 | 0.1 | 0.2 |
| | Amount of adsorbed fluorine (g-F/liter) | 1.3 | 1.0 | 0.3 |
| | Amount of adsorbed arsenic (g/As/liter) | 3.8 | 3.8 | 3.9 |
| Example 2 | Amount of adsorbed boron (g-B/liter) | 0.4 | 0.4 | 0.7 |
| | Amount of adsorbed fluorine (g-F/liter) | 5.1 | 3.8 | 1.3 |
| | Amount of adsorbed arsenic (g-As/liter) | 15 | 16 | 15 |

Industrial Applicability

A formed article according to the present invention does not have a skin layer and a superior opening rate at the surface. so that a substance to be adsorbed diffuses inside the formed article at high speeds. Accordingly, the formed article is suitable for an adsorbent and a filtration agent, which are used in the treatment for a liquid and a gas, a deodorant, an antimicrobial agent, a moisture absorbent, an agent for maintaining food freshness, various chromatographic carriers and a catalyst.

The invention claimed is:

1. A porous formed article which comprises fibrils comprising an organic polymer resin and an inorganic ion absorbing material and forming a three-dimensional network structure and has communicating pores opening at an outer surface, wherein
a gap between said fibrils becomes a communicating pore, said fibrils have cavities in the interior of each of said fibrils itself,
at least a part of said cavities opens at the surface of the fibril, and
the inorganic ion absorbing material is supported on the outer surface of said fibril and on the surface of inner cavities.

2. The porous formed article according to claim 1, wherein the communicating pores have a maximum pore diameter in a layer in the vicinity of the surface of the formed body.

3. The porous formed article according to any one of claims 1 and 2, wherein the porous formed article has an average particle diameter of 100 to 2,500 μm and is substantially spherical.

4. The porous formed article according to claim 1, wherein the organic polymer resin comprises one or more selected from the group consisting of ethylene-vinylalcohol copolymer (EVOH), polyacrylonitrile (PAN), polysulfone (PS) and polyvinylidene fluoride (PVDF)

5. The porous formed article according to claim 1, wherein the inorganic ion absorbing material comprises a compound represented by the following formula (I) and/or the following formula (II):

$$MO_n \cdot mH_2O \quad (I)$$

$$M \cdot Fe_2O_4 \cdot mH_2O + xFe_3O_4 \cdot nH_2O \quad (II)$$

(wherein n is 1 to 4; m is 0.5 to 6; x is 0 to 3; and M is at least one metal selected from the group consisting of Ti, Zr, Sn, Sc, Y, La, Ce, Pr, Nd, Sm, Eu, Gd, Tb, Dy, Ho, Er, Tm, Yb, Lu, Al, Cr, Co, Ga, Fe, Mn, Ni, V, Ge, Nb and Ta: and in the formula (II), a symbol (+) denotes that the formula shows a mixture).

6. The porous formed article according to claim 1, wherein the inorganic ion absorbing material comprises at least one selected from the group consisting of: a hydrated oxide of titanium, zirconium or tin; a hydrated ferrite of titanium, zirconium or tin; hydrated cerium oxide; hydrated lanthanum oxide; and activated alumina.

7. The porous formed article according to claim 1, wherein the inorganic ion absorbing material comprises at least one selected from the group consisting of activated alumina impregnated with aluminum sulfate and activated carbon impregnated with aluminum sulfate.

8. The porous formed article according to claim 1, wherein the inorganic ion absorbing material has a particle diameter of 0.01 to 100μm.

9. The porous formed article according to claim 1, wherein the inorganic ion absorbing material in an amount of 30 to 95% is supported thereon.

10. The porous formed article according to claim 1, wherein the fibril comprises the organic polymer resin, the inorganic ion absorbing material and a water-soluble polymer.

11. The porous formed article according to claim 10, wherein the water-soluble polymer is a synthetic polymer.

12. The porous formed article according to claim 10 or 11, wherein the water-soluble polymer is polyvinylpyrrolidone.

13. The porous formed article according to claim 10, wherein the water-soluble polymer in an amount of 0.001 to 10% is contained therein.

14. A column packed with the porous formed article according to claim 1.

15. An ion-adsorbing device for adsorbing ions in a liquid by passing the liquid through a column, wherein the column is packed with a porous formed article according to claim 1.

16. An ion-adsorbing device characterized in that pH-controlling device is installed in a previous stage of the column according to claim 15.

17. An ion-adsorbing device characterized in that a solid-liquid separation device is installed in a previous stage of the ion-adsorbing device according to claim 15 or 16.

18. The ion-adsorbing device according to claim 17, wherein the solid-liquid separation device is a membrane separation device.

19. The ion-adsorbing device according to claim 15, further comprising water-sending means for supplying a desorption liquid to the column.

20. The ion-adsorbing device according to claim 15, further comprising a crystallization tank, adding means for adding a crystallizing agent, a crystallizer provided with stirring means, and a solid-liquid separation device for separating precipitates produced in the crystallization tank into a solid and a liquid.

21. The ion-adsorbing device according to claim 20, wherein the solid-liquid separation device is a membrane separation device.

22. The ion-adsorbing device according to claim 20 or 21, further comprising liquid-supplying means for supplying an alkaline liquid which is obtained by separating a liquid from a solid after a crystallization reaction, to a column again.

23. The ion-adsorbing device according to claim 15, further comprising liquid-supplying means for supplying a pH-adjusting liquid to the column.

24. The ion-adsorbing device according to claim 23, capable of adjusting pH of a porous formed article packed in the column, which further comprises a pH-adjusting tank, a pH controller, a chemical liquid injection pump working with the pH controller, pH-adjusting-liquid-supplying means, and a line for passing water in the pH-adjusting tank to the column, to repeatedly circulate the pH-adjusting liquid between the column and the pH-adjusting tank and adjust the pH.

25. The ion-adsorbing device according to claim 15, further comprising liquid-supplying means for supplying wash water to the column.

26. The ion-adsorbing device according to claim 15, further comprising pH-adjusting means for adjusting pH of treatment water flowing out from the column.

27. A porous absorbing product comprising the porous formed article according to claim 1.

* * * * *